US010658830B2

(12) United States Patent
Ukil et al.

(10) Patent No.: US 10,658,830 B2
(45) Date of Patent: May 19, 2020

(54) POWER SYSTEM AND METHOD OF FORMING THE SAME

(71) Applicant: NANYANG TECHNOLOGICAL UNIVERSITY, Singapore (SG)

(72) Inventors: Abhisek Ukil, Singapore (SG); Hoay Beng Gooi, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 251 days.

(21) Appl. No.: 15/579,997

(22) PCT Filed: Jun. 3, 2016

(86) PCT No.: PCT/SG2016/050260
§ 371 (c)(1),
(2) Date: Dec. 6, 2017

(87) PCT Pub. No.: WO2016/209164
PCT Pub. Date: Dec. 29, 2016

(65) Prior Publication Data
US 2018/0138688 A1    May 17, 2018

(30) Foreign Application Priority Data
Jun. 23, 2015 (SG) .......................... 10201504962 U

(51) Int. Cl.
*H02H 3/08* (2006.01)
*H02J 7/00* (2006.01)
(Continued)

(52) U.S. Cl.
CPC ................ *H02H 3/08* (2013.01); *H01H 9/54* (2013.01); *H01H 33/64* (2013.01); *H01H 33/66* (2013.01);
(Continued)

(58) Field of Classification Search
CPC .. H02H 3/08; H02J 7/0052; H02J 3/00; H02J 7/0047; H02J 7/02; H02J 2003/007;
(Continued)

(56) References Cited

U.S. PATENT DOCUMENTS 8,760,825 B2    6/2014 Erger et al.
2007/0145952 A1    6/2007 Arcena
(Continued)

FOREIGN PATENT DOCUMENTS

WO    2014/140104 A1    9/2014

OTHER PUBLICATIONS

Protection System in Power System (Retrieved from http://web.archive.org/web/2014022000654/http://www.electrical4u.com/protection-system-in-power-system/) (4 pages total).
(Continued)

*Primary Examiner* — Dharti H Patel
(74) *Attorney, Agent, or Firm* — Sughrue Mion, PLLC

(57) ABSTRACT

The power system may include a main circuit arrangement having a power source, a load and a circuit breaker. The power system may additionally include an energy harvesting circuit arrangement connected to the main circuit arrangement. The energy harvesting circuit arrangement may include an operating switch and an energy harvester. The power system may also further include a trigger mechanism, which may be configured to, when detecting a current above a predetermined value in the main circuit arrangement, trigger the circuit breaker to switch from a closed mode to an open mode. The trigger mechanism may also be configured to trigger the operating switch to switch from an open mode to a closed mode for a predetermined duration, and back to the open mode after the predetermined duration, thereby storing electrical energy in the energy harvester.

16 Claims, 22 Drawing Sheets

(51) Int. Cl.
| | |
|---|---|
| *H02J 3/00* | (2006.01) |
| *H01H 9/54* | (2006.01) |
| *H01H 33/64* | (2006.01) |
| *H01H 33/66* | (2006.01) |
| *H01H 71/24* | (2006.01) |
| *H02J 7/02* | (2016.01) |
| *H01H 71/00* | (2006.01) |
| *H01H 89/00* | (2006.01) |

(52) U.S. Cl.
CPC ............. *H01H 71/24* (2013.01); *H02J 3/00* (2013.01); *H02J 7/00* (2013.01); *H02J 7/0047* (2013.01); *H02J 7/02* (2013.01); *H01H 71/00* (2013.01); *H01H 89/00* (2013.01); *H02J 7/0048* (2020.01); *H02J 2203/20* (2020.01); *Y02E 60/76* (2013.01); *Y04S 40/22* (2013.01)

(58) Field of Classification Search
CPC ... H02J 2007/005; H01H 71/24; H01H 33/66; H01H 33/64; H01H 9/54; H01H 89/00; H01H 71/00; Y02E 60/76; Y04S 40/22
USPC .......................................................... 361/102
See application file for complete search history.

(56) References Cited

U.S. PATENT DOCUMENTS

| | | | |
|---|---|---|---|
| 2013/0293994 A1 | 11/2013 | Bellini et al. | |
| 2015/0108090 A1* | 4/2015 | Oates ................... | H01H 33/596 218/10 |
| 2015/0179377 A1* | 6/2015 | Han ..................... | H01H 47/002 307/125 |

OTHER PUBLICATIONS

A. Ukil et al., "Monitoring of HV Generator Circuit Breaker Contact Ablation Based on Acoustic Emission", IEEE Transactions on Instrumentation and Measurement, Oct. 2013, vol. 62, No. 10, pp. 2683-2693 (11 pages total).

A. Anwar et al., "Fault Current Reduction Using Inverter Controlled Energy Storage for Shipboard MVAC Power System", 2011 IEEE Electric Ship Technologies Symposium, Apr. 13, 2011, pp. 315-318 (4 pages total).

"IEEE Recommended Practice for Applying Low-Voltage Circuit Breakers Used in Industrial and Commercial Power Systems", IEEE Std 1015™-2006 (Revision of IEEE Std 1015-1997) (210 pages total).

S. I. Kopylov et al., "Joint operation of the superconducting fault current limiter and magnetic energy storage system in an electric power network," Journal of Physics: Conference Series, vol. 234, part 3, pp. 1-7, 2010. Available: http://dx.doi.org/10.1088/1742-6596/234/3/032029 (7 pages total).

Won-Sik Moon et al., "A Study on the Application of a Superconducting Fault Current Limiter for Energy Storage Protection in a Power Distribution System," IEEE Transactions on Applied Superconductivity, vol. 23, No. 3, Jun. 2013 (4 pages total).

International Search Report dated Aug. 11, 2016 for PCT/SG2016/050260 [PCT/ISA/210].

* cited by examiner

200

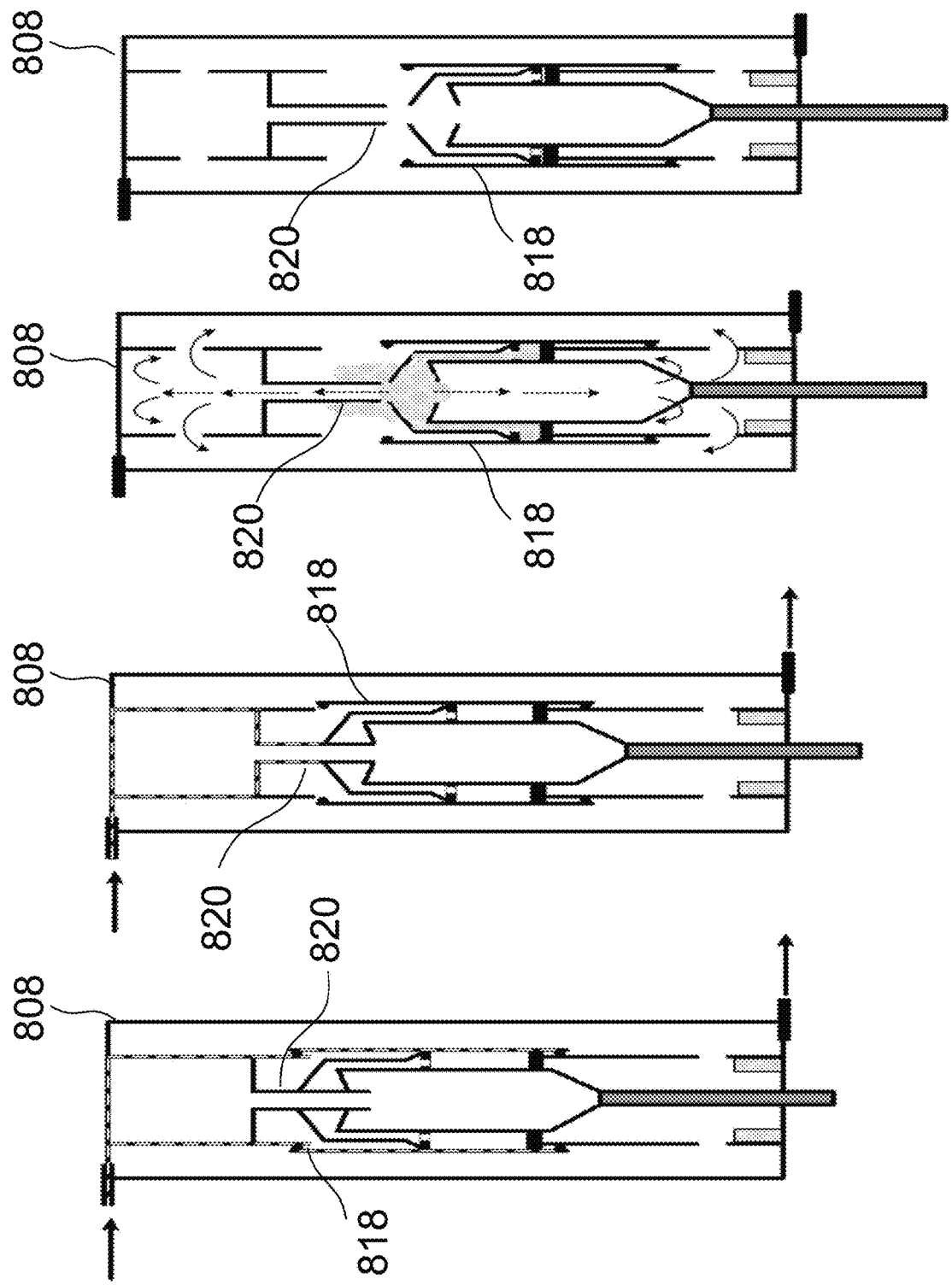

POWER SYSTEM AND METHOD OF FORMING THE SAME

CROSS-REFERENCE TO RELATED APPLICATION

This application is a National Stage of International Application No. PCT/SG2016/050260 filed Jun. 3, 2016, and claims priority to Singapore application No. 10201504962U filed Jun. 23, 2015, the contents of both of which are hereby incorporated by reference in their entirety for all purposes.

TECHNICAL FIELD

Various aspects of this disclosure relate to power systems and methods of forming the same.

BACKGROUND

In power systems transmission and distribution, protection plays a central role for disturbance-free power supply. Power systems are required to have protective elements like the circuit breakers (CB) in order to ensure isolation of circuits in case of faults. The faults are usually short-circuits involving two or three phases, with or without the ground. FIG. 1 shows the schematic of a power transmission system 100. The transmission line is represented using a series resistor-inductor (R-L) circuit 102, the power generator as the voltage source (e(t)) 104, and the circuit breaker is represented as a switch (SW) 106. During normal operation, the switch is normally closed (NC) to ensure load current flow. In the event of a fault, high current flows through the circuit, so the switch is opened to isolate the circuit, which is also termed as "breaking".

The fault current has high magnitude. For example, in high voltage (HV) transmission, which typically involves more than 65 kV, the fault current may be typically about 100 kA or more. For medium voltage (MV) transmission, which is typically less than 35 kV, and low voltage (LV) transmission, which is typically less than 1 kV, the fault current may range from about 10 kA to about 50 kA. Such high current is detrimental for the whole power system, and should be isolated as fast as possible. Electrically isolation may be achieved by separating the poles of the circuit breaker (CB).

SUMMARY

Various aspects of this disclosure may provide a power system. The power system may include a main circuit arrangement. The main circuit arrangement may include a power source. The main circuit arrangement may also include a load. The main circuit arrangement may further include a circuit breaker. The power system may additionally include an energy harvesting circuit arrangement connected to the main circuit arrangement. The energy harvesting circuit arrangement may include an operating switch. The energy harvesting circuit arrangement may also include an energy harvester. The power system may also further include a trigger mechanism. The trigger mechanism may be configured to, when detecting a current above a predetermined value in the main circuit arrangement, trigger the circuit breaker to switch from a closed mode in which the circuit breaker electrically connects the load to the power source, to an open mode in which the load is electrically isolated from the power source. The trigger mechanism may also be configured to trigger the operating switch to switch from an open mode in which the energy harvester is electrically isolated from the power source to a closed mode in which the operating switch electrically connects the energy harvester to the power source for a predetermined duration, and back to the open mode after the predetermined duration, thereby storing electrical energy in the energy harvester.

Various aspects of this disclose may provide a method of forming a power system. The method may include providing a main circuit arrangement. The main circuit arrangement may include a power source. The main circuit arrangement may also include a load. The main circuit arrangement may further include a circuit breaker. The method may further include, in connecting an energy harvesting circuit arrangement to the main circuit arrangement. The energy harvesting circuit arrangement may include an operating switch. The energy circuit arrangement may further include an energy harvester. The method may also include providing a trigger mechanism. The trigger mechanism may be configured to, when detecting a current above a predetermined value in the main circuit arrangement, trigger the circuit breaker to switch from a closed mode in which the circuit breaker electrically connects the load to the power source, to an open mode in which the load is electrically isolated from the power source, and trigger the operating switch.

Various aspects of this disclosure may provide a power system. The power system may include a main circuit arrangement. The main circuit arrangement may include a power source. The main circuit arrangement may also include a load. The main circuit arrangement may further include a circuit breaker. The power system may additionally include an energy harvesting circuit arrangement connected to the main circuit arrangement. The energy harvesting circuit arrangement may include an operating switch. The energy harvesting circuit arrangement may also include an energy harvester. The power system may also further include a trigger mechanism. The trigger mechanism may be configured to, when detecting a current above a predetermined value in the main circuit arrangement, trigger the operating switch to switch from an open mode in which the energy harvester is electrically isolated from the power source to a closed mode in which the operating switch electrically connects the energy harvester to the power source for a predetermined duration so that the current flowing through the circuit breaker is reduced, thereby preventing the circuit breaker from breaking. The trigger mechanism may be further configured to trigger the operating switch back to the open mode after the predetermined duration, thereby storing electrical energy in the energy harvester.

Various aspects of this disclose may provide a method of forming a power system. The method may include providing a main circuit arrangement. The main circuit arrangement may include a power source. The main circuit arrangement may also include a load. The main circuit arrangement may further include a circuit breaker. The method may further include, in connecting an energy harvesting circuit arrangement to the main circuit arrangement. The energy harvesting circuit arrangement may include an operating switch. The energy circuit arrangement may further include an energy harvester. The method may also include providing a trigger mechanism. The trigger mechanism may be configured to, when detecting a current above a predetermined value in the main circuit arrangement, trigger the operating switch to switch from an open mode in which the energy harvester is electrically isolated from the power source to a closed mode in which the operating switch electrically connects the energy harvester to the power source for a predetermined duration so that the current flowing through the circuit breaker is reduced, thereby preventing the circuit breaker from breaking. The trigger mechanism may be further configured to trigger the operating switch back to the open mode after the predetermined duration, thereby storing electrical energy in the energy harvester.

BRIEF DESCRIPTION OF THE DRAWINGS

The invention will be better understood with reference to the detailed description when considered in conjunction with the non-limiting examples and the accompanying drawings, in which:

FIG. 8 shows the breaking operation of the circuit breaker according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Figure 1:
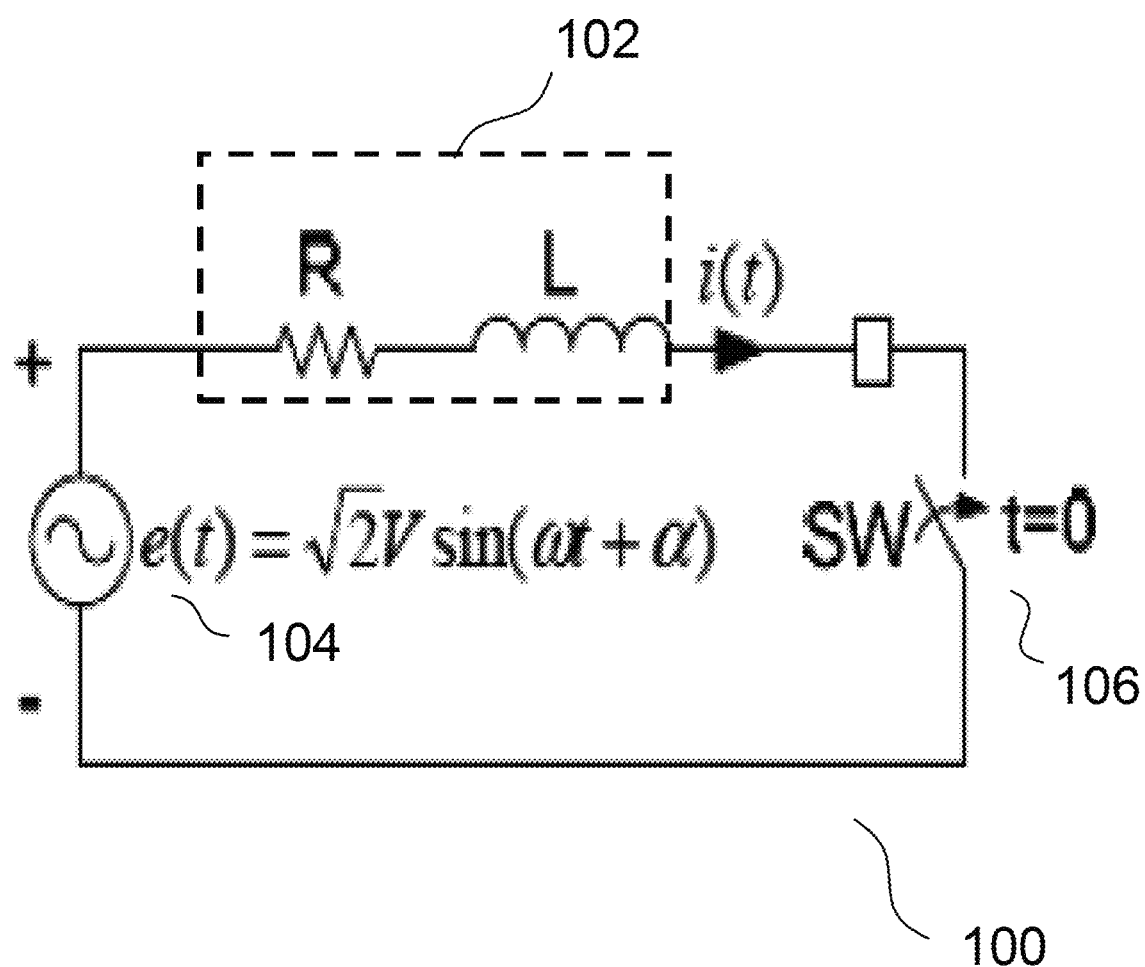
FIG. 1 shows the schematic of a power transmission system.
Figure 2:
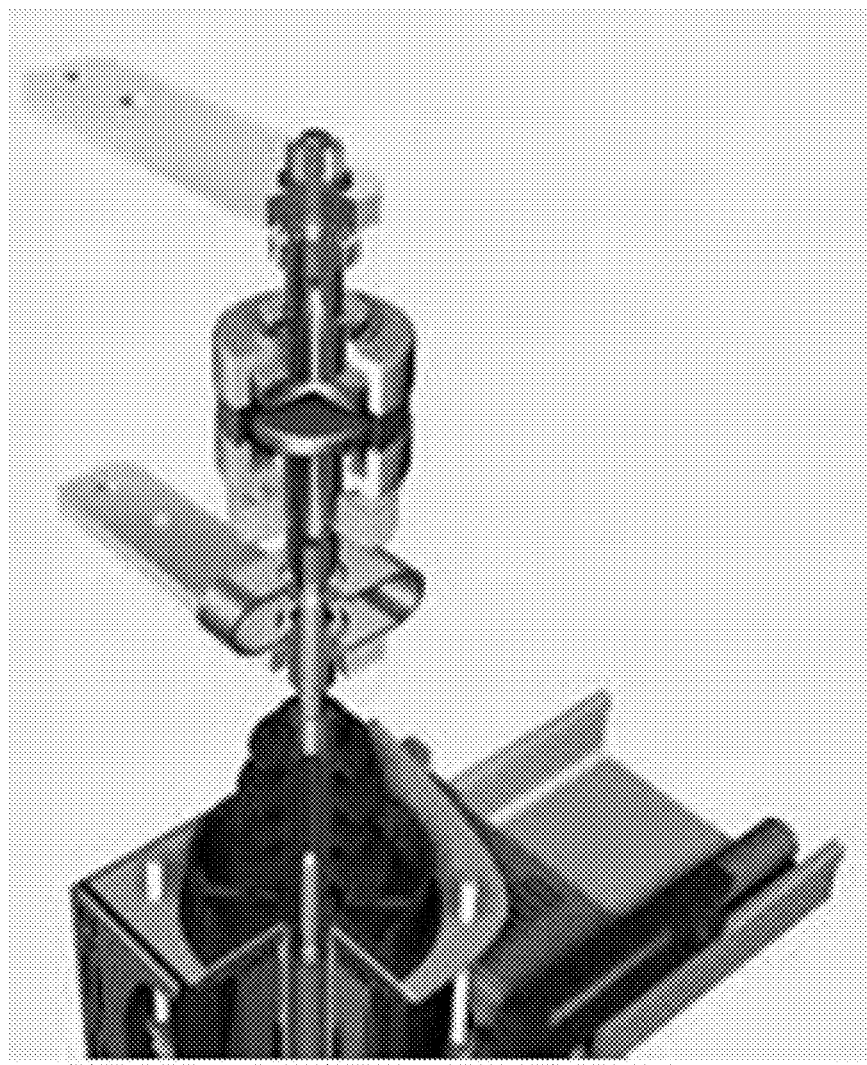
FIG. 2 is an image of a medium voltage (MV) circuit breaker (CB).

FIG. 2 is an image 200 of a medium voltage (MV) circuit breaker (CB). The CB may be opened (i.e. disconnected) via opening mechanism to isolate the fault current. Due to separation of the contact poles, there may be arcing (due to breaking high current). The arc may get quenched due to sulfur hexafluoride gas ($SF_6$) gas (for HV transmission), or due to vacuum (for MV, LV transmissions), and the circuit may be electrically isolated. The energy due to fault current isolation may be dissipated as heat and may evaporate the CB contact pole materials. Thus, due to continuous operation, the CB contact poles (which are made of special materials) may gradually get ablated. Such CB and contact ablation monitoring may be available currently.

Various embodiments may seek to reduce the energy stress of the CB. Various embodiments may seek to harness the fault energy.

Figure 3:
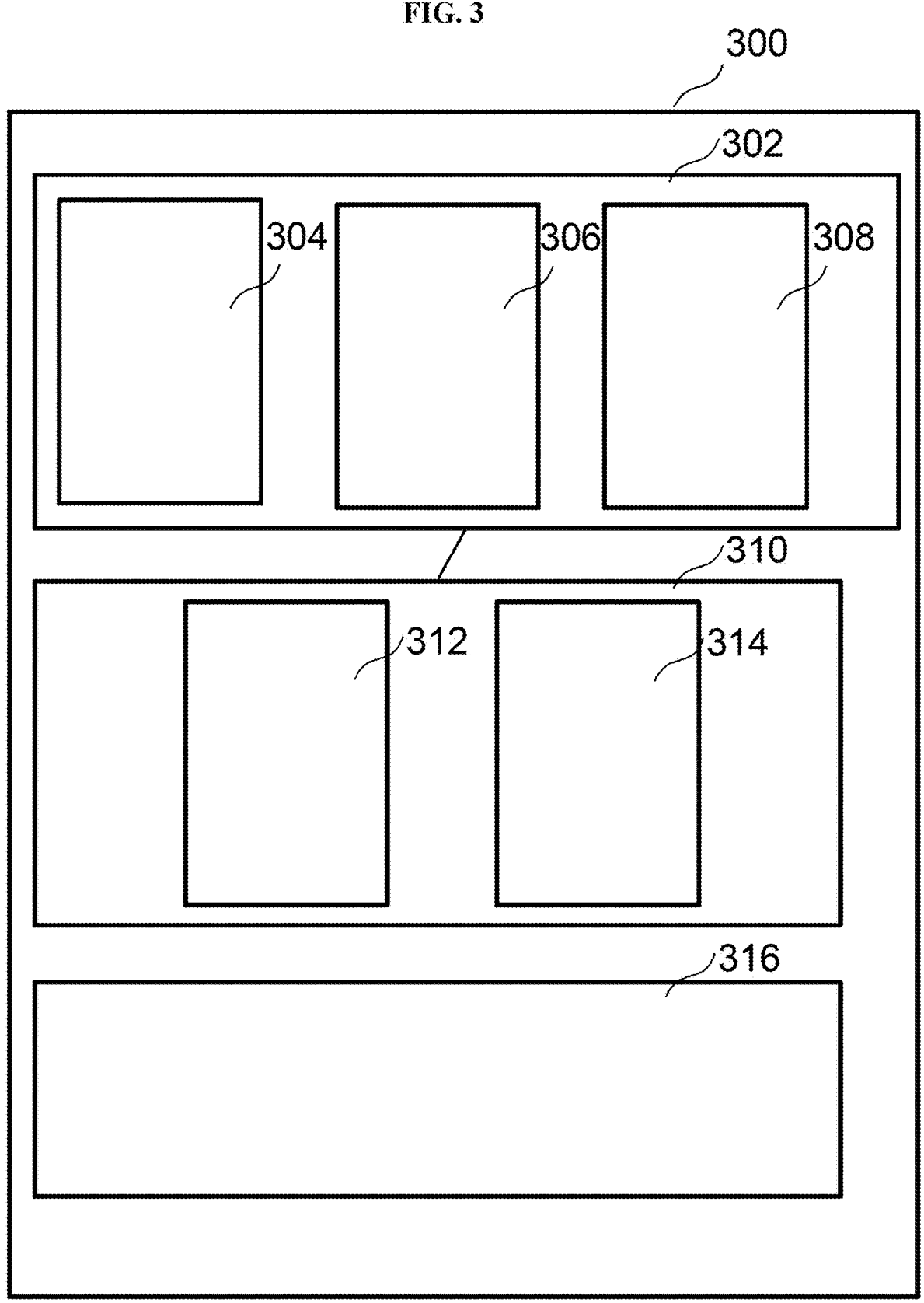
FIG. 3 is a schematic of a power system according to various embodiments.

FIG. 3 is a schematic of a power system 300 according to various embodiments. The power system 300 may include a main circuit arrangement 302. The main circuit arrangement 302 may include a power source 304. The main circuit arrangement 302 may also include a load 306. The main circuit arrangement 302 may further include a circuit breaker 308. The power system 300 may additionally include an energy harvesting circuit arrangement 310 connected to the main circuit arrangement 302. The energy harvesting circuit arrangement 310 may include an operating switch 312. The energy harvesting circuit arrangement 310 may also include an energy harvester 314. The power system may also further include a trigger mechanism 316. The trigger mechanism 316 may be configured to, when detecting a current above a predetermined value in the main circuit arrangement 302, trigger the circuit breaker 308 to switch from a closed mode in which the circuit breaker 308 electrically connects the load 306 to the power source 304, to an open mode in which the load 306 is electrically isolated from the power source 304. The trigger mechanism 316 may also be configured to trigger the operating switch 312 to switch from an open mode in which the energy harvester 314 is electrically isolated from the power source 304 to a closed mode in which the operating switch 312 electrically connects the energy harvester 314 to the power source 304 for a predetermined duration, and back to the open mode after the predetermined duration, thereby storing electrical energy in the energy harvester 314.

In other words, power system 300 may include a main circuit arrangement 302, an energy harvesting circuit arrangement 310 in electrical connection with the main circuit arrangement 302, and a trigger mechanism 316. The main circuit arrangement 302 may include a power source 304, a load 306, and a circuit breaker 308. The energy harvesting circuit arrangement 310 may include an operating switch 312 and an energy harvester 314. When a fault current above a certain threshold is detected by the trigger mechanism 316, the trigger mechanism 316 may cause the circuit breaker 308 to "break", i.e. causing a disruption to the current flow in the main circuit arrangement 302. Also, when the fault current above the certain threshold is detected by the trigger mechanism 316, the trigger mechanism 316 may cause the operating switch 312 to close, and direct at least some current to the energy harvester 314 for charging the energy harvester 314. The operating switch 312 may then open to prevent loss of the stored electrical energy.

When the circuit breaker 308 electrically connects the load 306 to the power source 304, a current may flow from the power source 304 to the load 306 via the circuit breaker 308. When the load 306 is electrically isolated from the power source 304, no current may flow between the power source 304 and the load 306. When the operating switch 312 electrically connects the energy harvester 314 to the power source 304, a current may flow from the power source 304 to the energy harvester 314 via the operating switch 312. When the energy harvester 314 is electrically isolated from the power source 304, no current may flow between the power source 304 and the energy harvester 314.

In various embodiments, the circuit breaker 308 and/or operating switch 312 may be linked and/or synchronized by the trigger mechanism 316. The trigger mechanism 316 may be part of the main circuit arrangement 302. The trigger mechanism 316 may be alternatively part of the energy harvesting circuit arrangement 310 or may be a standalone device/component.

In various embodiments, the trigger mechanism 316 may include a protective relay. The protective relay may be an electronic relay.

In various embodiments, the trigger mechanism 316 may include a trip coil configured to transmit a trigger from the protective relay to the circuit breaker 308.

In various embodiments, the trigger mechanism 316 may include a sensor to detect or measure the current. The trigger mechanism 316 may include a processor configured to determine whether the current is above the predetermined level. The determination may be made based on a signal containing readings of the current made by the sensor. The processor may be further configured to trigger the circuit breaker 308 and the operating switch 312, after the processor determines that the current is above the predetermined level. The processor may be configured to trigger the operating switch 312 to close for the predetermined duration, and trigger the operating switch 312 to open after the predetermined duration.

The energy harvester 314 may include an energy storage device. The energy storage device may be configured to store electrical energy. The energy storage device may be configured to store electrical energy harvested from the main circuit arrangement 302. The energy harvester 314 may additionally include a charging device configured to charge the energy storage device when the operating switch 312 is in the closed position. The charging device may be coupled in series to the energy storage device. The charging device may alternatively be coupled in parallel to the energy storage device.

The energy storage device may be selected from a group consisting of a battery, a supercapacitor and a combination thereof. In other words, the energy storage device may be a battery, a super capacitor or a hybrid device including a battery and a supercapacitor. The battery may be a rechargeable battery.

The energy harvesting circuit arrangement may further include a variable resistor for limiting a charging current flowing through the energy harvesting circuit arrangement 310 during the predetermined duration. In other words, the variable resistor may be configured to keep the current flowing through the energy harvesting circuit arrangement 310 below a certain threshold. The threshold may be set manually or may be set automatically. The threshold may be set automatically based on the type of energy storage device and/or the power source.

The circuit breaker 308 may include a nominal contact switch and an arcing contact switch. The arcing contact switch may be connected in parallel to the nominal contact switch.

The circuit breaker 308 may be configured to, during switching from the closed mode to the open mode, switch the nominal contact switch from a closed position to an open position before switching the arcing contact switch from a closed position to an open position. In other words, the "breaking" of the circuit breaker 308 may involve opening the nominal contact switch, before the opening of the arcing contact switch. When a switch is closed, the ends of the switch, i.e. contacts, may be in contact or near each other to close the circuit in which the switch is part of so that a current passes through the circuit. On the other hand, when a switch is opened, the ends of the switch may be separated from each other (to beyond a predetermined distance) so that the current flowing from one end to the other end is interrupted, resulting in the circuit being an open circuit in which no current flows.

When the nominal contact switch is in the open position and when the arcing contact switch is in the closed position, a current may flow through the arcing contact switch in the closed position. No current may flow through the nominal contact switch. During the time interval when the nominal switch is in the open position while the arcing contact switch is in the closed position, all the current passing through the circuit breaker 308 may pass the closed arcing contacts.

The predetermined value may be selected from a range of about 1.01 times to about 20 times relative to a normal operating current flowing through the main circuit arrangement 302. A current over the predetermined value may be referred to as an over current, while a current lower than the predetermined value may be referred to as a normal operating current. The predetermined value may, for instance, be any value selected from a range of about 50 A to about 200 A.

The trigger mechanism 312 may be configured to trigger the circuit breaker 308 to switch from the closed mode to the open mode, and trigger the operating switch 312 to switch from the open mode to the closed mode for the predetermined duration, and back to the open mode after the predetermined duration, when the trigger mechanism 316 detects the current above the predetermined level for a predetermined time period. In other words, the trigger mechanism 312 may be configured to switch the circuit breaker 308, and the operating switch 312 only when the trigger mechanism detects the current is above the predetermined level for a certain predetermined period of time, i.e. when the current exceeds the predetermined level for a duration exceeding the predetermined period. The predetermined time period may, for instance, be any value selected from a range of about 0.01 seconds to about 1 second, e.g. about 0.02 seconds to about 0.2 seconds. In various embodiments, the trigger mechanism 312 may include a processor that determines whether the current is above the predetermined level for a predetermined period of time. The processor may be further configured to trigger the circuit breaker 308 and the operating switch 312, after the processor determines that the current is above the predetermined level for the predetermined period of time.

The circuit breaker 308 may include a vacuum for electrically isolating the load 306 from the power source 304 when the circuit breaker 308 is in the open mode. Alternatively, the circuit breaker 308 may include a quenching gas for electrically isolating the load 306 from the power source 304 when the circuit breaker 308 is in the open mode. The quenching gas may be sulfur hexafluoride ($SF_6$) gas. The sulfur hexafluoride gas is an electronegative gas and has a strong tendency to absorb free electrons. The contacts of the breaker 308 may be opened in a high pressure flow of sulfur hexafluoride gas and an arc is struck between them. The gas may capture the conducting free electrons in the arc to form relatively immobile negative ions. This loss of conducting electrons in the arc may quickly build up enough insulation strength to extinguish the arc.

The circuit breaker 308 may have a chamber containing the vacuum or the quenching gas. The circuit breaker 308 may include a valve mechanism configured to direct vacuum or the quenching gas from the chamber to between the contacts of the arcing contact switch for quenching the arc current between the contacts.

The load 306 may be any device or component or machine configured to draw electrical energy from the power source 304. The power source 304 may be configured to generate alternating current, i.e. the power source 304 may be an alternating current (AC) source.

In various embodiments, the trigger mechanism 316 may be configured to, when detecting a current above a predetermined value in the main circuit arrangement 302, trigger the operating switch 312 to switch from an open mode in which the energy harvester 314 is electrically isolated from the power source 304 to a closed mode in which the operating switch 312 electrically connects the energy harvester 314 to the power source 304 for a predetermined duration so that the current flowing through the circuit breaker 308 is reduced, thereby preventing the circuit breaker 308 from breaking. The trigger mechanism 316 may be further configured to trigger the operating switch 312 back to the open mode after the predetermined duration, thereby storing electrical energy in the energy harvester 314.

In other words, when the current is above a predetermined value, the operating switch 312 may be activated to divert some of the current away to the energy harvester 314. The current in the main circuit arrangement 302 may be reduced, thus preventing the circuit breaker 308 from going into open mode.

In various embodiments, the current may be below a predetermined threshold. In various embodiments, the circuit breaker 308 may be configured not to go into open mode, i.e. configured not to break, when the current is below the predetermined threshold. The predetermined threshold may be higher than the predetermined value. In various embodiments, the predetermined threshold may be any suitable value. The predetermined threshold may, for instance, be any value selected from a range of about 70 A to about 300 A.

Various embodiments may seek to achieve fault ride through capability in the power system 300. Fault ride through may refer to instances in which the power system 300 is on (i.e., the source 304 is still connected to the load 306 and the main circuit 302 is not broken) while the fault is on. For faults that are temporary, e.g. for faults that get cleared in a few cycles, the circuit breaker 308 may not break so a fault current still flows from the power source 304 to the load 306. The fault current that flow through the main circuit arrangement is reduced as a portion of the fault current is diverted to the energy harvester 314.

Various embodiments may relate to power systems or generators based on renewable energy sources, such as wind generators. It may be important for the generator power source to remain connected to the load 306. In the event that the circuit breaker 308 breaks, as it may be difficult to restart the power system or generator.

During such fault ride through, a relative high fault current may flow and may cause lot of stress on the circuit breaker 308. Various embodiments may help to reduce the stress by diverting current to the energy harvesting circuit arrangement 310, helping to achieve fault ride through. Various embodiments may further help to ride through tougher faults, and may allow the power system to sustain for a longer duration.

The fault ride through may be applicable at high-voltage (HV), medium-voltage (MV) or low-voltage (LV) levels, depending on the utilization.

Figure 4:
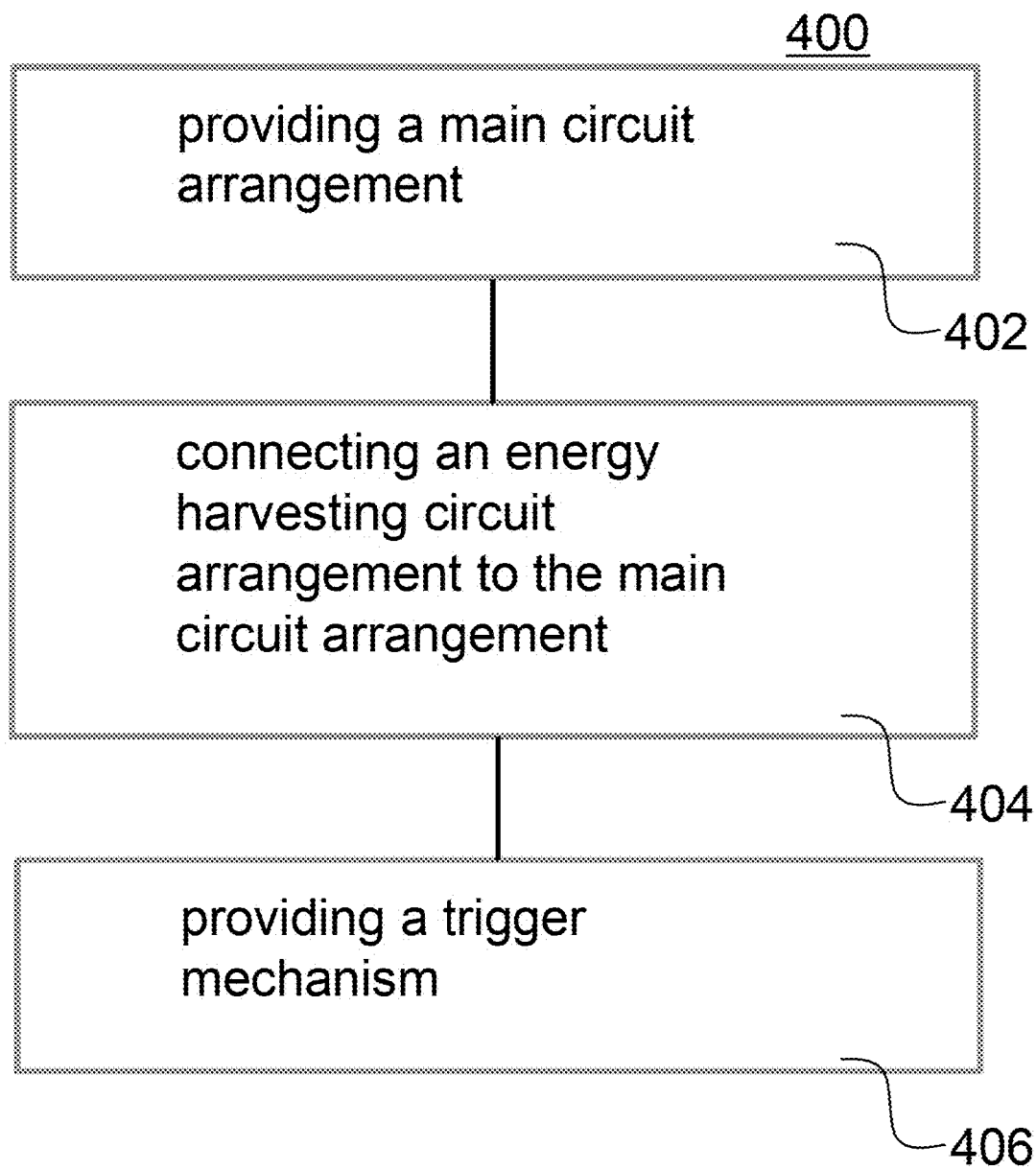
FIG. 4 is a schematic illustrating a method of forming a power system according to various embodiments.

In various embodiments, a method of forming a power system may be provided. FIG. 4 is a schematic 400 illustrating a method of forming a power system according to various embodiments. The method may include, in 402, providing a main circuit arrangement. The main circuit arrangement may include a power source. The main circuit arrangement may also include a load. The main circuit arrangement may further include a circuit breaker. The method may further include, in 404, connecting an energy harvesting circuit arrangement to the main circuit arrangement. The energy harvesting circuit arrangement may include an operating switch. The energy circuit arrangement may further include an energy harvester. The method may also include, in 406, providing a trigger mechanism. The trigger mechanism may be configured to, when detecting a current above a predetermined value in the main circuit arrangement, trigger the circuit breaker to switch from a closed mode in which the circuit breaker electrically connects the load to the power source, to an open mode in which the load is electrically isolated from the power source, and trigger the operating switch.

In other words, a method of forming a power system may be provided. The method may include connecting an energy harvesting circuit arrangement to the main circuit arrangement. The method may also include providing a trigger mechanism. The main circuit arrangement may include a power source, a load, and a circuit breaker. The energy harvesting circuit arrangement may include an operating switch, and an energy harvester. When a fault current above a certain threshold is detected by the trigger mechanism, the trigger mechanism may cause the circuit breaker to "break", i.e. causing a disruption to the current flow in the main circuit arrangement. Also, when the fault current above the certain threshold is detected by the trigger mechanism, the trigger mechanism may cause the operating switch to close and direct at least some current to the energy harvester for charging the energy harvester. The operating switch may then open again for preventing loss of the stored electrical energy.

The trigger mechanism may include a protective relay, such as an electronic relay. The trigger mechanism may further include a trip coil configured to transmit a trigger from the protective relay to the circuit breaker.

The energy harvester may include an energy storage device. The energy harvester may also include a charging device configured to charge the energy storage device when the operating switch is in the closed position. The energy storage device may be selected from a group consisting of a battery, a supercapacitor and a combination thereof.

The energy harvesting circuit arrangement may further include a variable resistor for limiting a charging current flowing through the energy harvesting circuit arrangement during the predetermined duration.

The circuit breaker may include a nominal contact switch and an arcing contact switch connected in parallel to the nominal contact switch. The circuit breaker may be configured to, during switching from the closed mode to the open mode, switch the nominal contact switch from a closed position to an open position before switching the arcing contact switch from a closed position to an open position.

When the nominal contact switch is in the open position and when the arcing contact switch is in the closed position, a current may flow through the arcing contact switch in the closed position. During the time interval when the nominal switch is in the open position while the arcing contact switch is in the closed position, all the current passing through the circuit breaker may pass the closed arcing contacts.

The predetermined value may be selected from a range of about 1.01 times to about 20 times relative to a normal operating current flowing through the main circuit arrangement.

The trigger mechanism may be configured to trigger the circuit breaker to switch from the closed mode to the open mode, and trigger the operating switch to switch from the open mode to the closed mode for the predetermined duration, and back to the open mode after the predetermined duration, when the trigger mechanism detects the current above the predetermined level for a predetermined time period.

In various embodiments, the circuit breaker may include a vacuum for electrically isolating the load from the power source when the circuit breaker is in the open mode. In various alternate embodiments, the circuit breaker may include a quenching gas for electrically isolating the load from the power source when the circuit breaker is in the open mode. The quenching gas may be sulfur hexafluoride gas.

In various embodiments, the trigger mechanism may be configured to, when detecting a current above a predetermined value in the main circuit arrangement, trigger the operating switch to switch from an open mode in which the energy harvester is electrically isolated from the power source to a closed mode in which the operating switch electrically connects the energy harvester to the power source for a predetermined duration so that the current flowing through the circuit breaker is reduced, thereby preventing the circuit breaker from breaking. The trigger mechanism may be further configured to trigger the operating switch back to the open mode after the predetermined duration, thereby storing electrical energy in the energy harvester.

In various embodiments, a method of achieving fault ride through capability in a power system may be provided.

Figure 5:
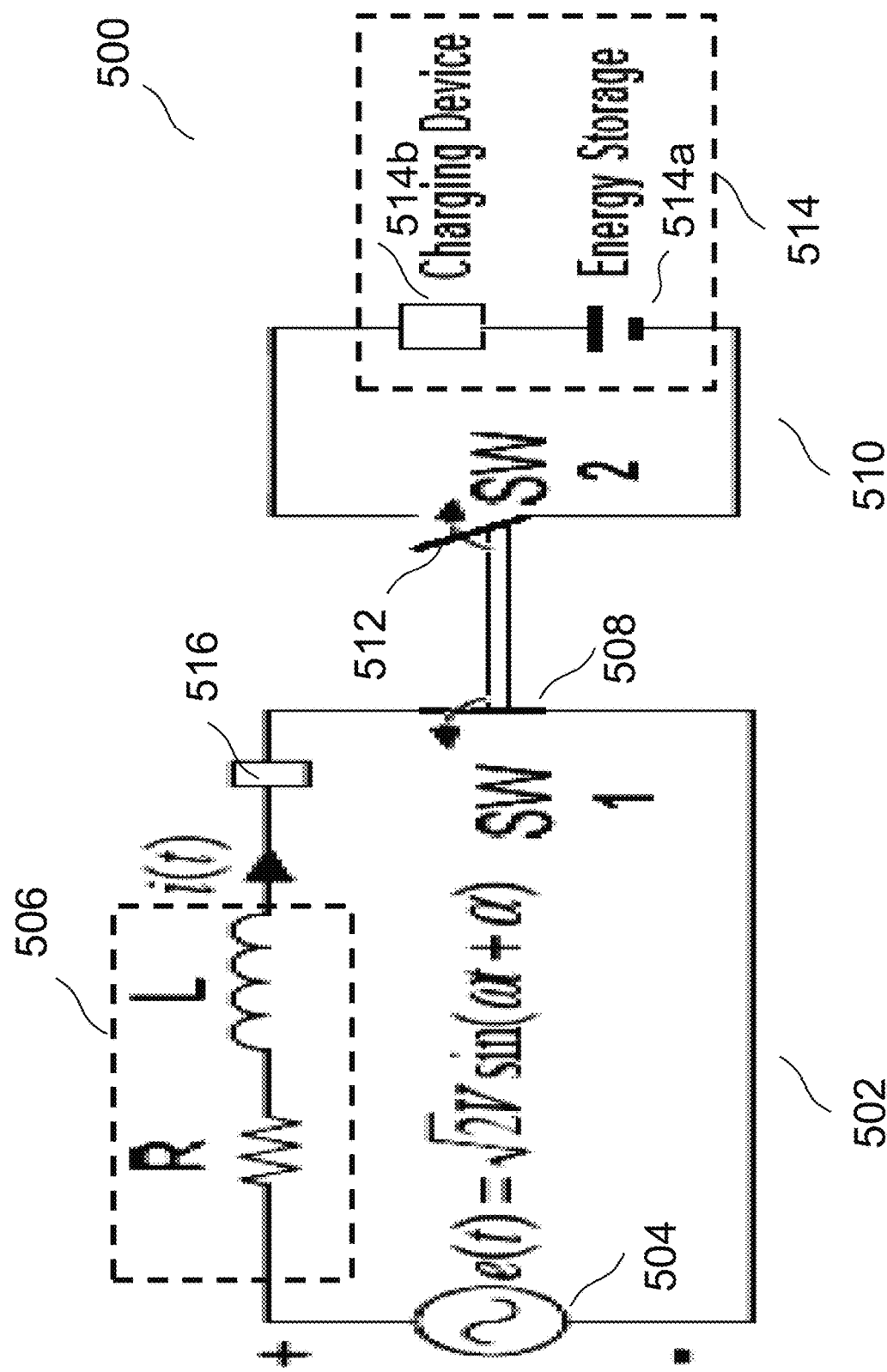
FIG. 5 is a schematic of a power system according to various embodiments.

FIG. 5 is a schematic of a power system 500 according to various embodiments. The power system 500 may include a main circuit arrangement 502. The main circuit arrangement 502 may include a power source 504. The main circuit arrangement 502 may also include a load 506. The main circuit arrangement 502 may further include a circuit breaker 508. The power system 500 may additionally include an energy harvesting circuit arrangement 510 connected to the main circuit arrangement 502. The energy harvesting circuit arrangement 510 may include an operating switch 512. The energy harvesting circuit arrangement 510 may also include an energy harvester 514. The power system 500 may also further include a trigger mechanism 516. The trigger mechanism 516 may be configured to, when detecting a current above a predetermined value in the main circuit arrangement 502, trigger the circuit breaker 508 to switch from a closed mode in which the circuit breaker 508 electrically connects the load 506 to the power source 504, to an open mode in which the load is electrically isolated from the power source 504. The trigger mechanism 516 may also be configured to trigger the operating switch 512 to switch from an open mode in which the energy harvester 514 is electrically isolated from the power source 504 to a closed mode in which the operating switch 512 electrically connects the energy harvester 514 to the power source 504 for a predetermined duration, and back to the open mode after the predetermined duration, thereby storing electrical energy in the energy harvester 514.

The circuit breaker 508 may be represented as SW1 or CB. In various embodiments, the circuit breaker 508 may be viewed as a switch or a switching mechanism, and may be referred to as a main circuit switching mechanism. The operating switch 512 may be represented as SW2, and may be referred to as a battery operating switch or battery switch. The two switches 508, 512 may be interlinked and synchronized with the trigger mechanism 516, which may be referred to as a circuit breaker (CB) triggering mechanism. The load 506 may be represented by a resistor (R) and an inductor (L) connected in series.

The circuit breaker 508 (SW1, CB) may be normally closed, while the operating switch 512 (SW2) may be normally open. As the CB or SW1 508 starts opening, SW2 512 may start to close. The triggering may be done by the trigger mechanism 516, which may be a protective relay.

The energy harvester 514 may include an energy storage device 514a and a charging device 514b.

Part of the fault current may flow through the charging device 514b to charge the energy storage device 514a, allowing a significant part of the fault energy to be harnessed. At the same time, the energy stress of the CB 508 may be greatly reduced, prolonging the lifetime of the CB 508. After the complete circuit isolation, i.e., when the CB 508 is completely open, the operating switch 512 may be opened again, which may prevent discharge of the energy storage device 514a to the main circuit arrangement 502.

The energy storage device 514a may be optimized for harnessing high energy at short internal. Typical CB operating time, i.e. from fully close to fully open, may be in the range of about 1 to about 10 cycles. In other words, the duration for the CB 508 to switch from fully close to fully open may be any value selected from a range of about 1 cycle to about 10 cycles. At 50 Hz, 1 cycle may be about 20 milliseconds or ms, i.e. the energy harvesting time may be about 20 ms to about 200 ms. In other words, the duration for the CB 508 to switch from fully closed to fully open may be any value selected from a range of about 20 ms to about 200 ms, which may be equal to the time wherein the energy harvester 514 may harvest energy from the main circuit arrangement 502.

Various embodiments seek to harness energy from energy dissipation during fault or transient operations. The fault current may range from a bit more than the nominal current (i.e. the normal operating current in the main circuit) to high values, e.g., from 1.01 to 20 times the nominal current, for about 10 cycles to about 1 cycle. For low currents, longer monitoring cycles may be required, vice versa. For example, for a 60 kV high voltage (HV) line, for nominal current (RMS) of 1 kA, with a fault of 5 times nominal current and 1 cycle (50 Hz) of monitoring, $$\text{Energy dissipation during fault} = (60 \times 10^3)V \times 5 \times (1 \times 10^3)A \times (20 \times 10^{-3})s = 6000 \times 10^3 J = 6 \text{ MJ} \quad (1)$$

Various embodiments may include an energy storage device 514a, e.g. a battery, put in parallel to the CB 508. The battery 514a may have its own switch 512. The CB triggering mechanism 516 may be synchronized with the battery switch 514a. When the CB 508 is breaking the main circuit arrangement 502, the battery switch 514a may be closed. Thus, part of the fault current may flow to the energy storage device 514a, which may allow a significant part of the fault energy to be harnessed. At the same time, the energy stress of the CB 508 may be greatly reduced, prolonging its lifetime. After the complete circuit isolation, i.e., when the CB 508 is completely open, the battery switch 514a may be opened again.

As energy storage devices are increasingly being used in microgrid setups under the 'Smart Grid' initiative, such schemes may be effective, and may be practically implemented.

Various embodiments may have one or more of the following advantages or improvements. The fault energy (which could be in the range of MJ) may be harvested, instead of wasting it by eroding the CB contact material seen in conventional circuit breakers.

Also, the power system may have a new generating source, by capturing the fault energy in an energy storage device 514a, and reutilizing the stored energy subsequently.

In various embodiments, the energy harvesting may be done not just during fault, but also in nominal switching operations, such as pumped hydro storage applications, or simple on/off switching at low voltages (LV). The circuit breaker 508 may be referred to as a main circuit switching mechanism.

Various embodiments may effectively use energy storage devices 514a, which are increasingly being used at grid scale. The energy harvesters 514 may provide sufficient means for harvesting the fault energy and/or reutilization of the stored energy.

For high voltage (HV) applications, the CB operation may not be as frequent, but for medium (MV) and low voltage (LV) applications, the "breaking" or disconnection of circuit breakers may happen more frequently. Various embodiments may be applicable for different voltage levels.

Various embodiments may reduce energy stress on the CB 508, prolonging the lifetime of the circuit breaker 508. Various embodiments may save costs for utilities and companies (MV, HV), and normal household consumers (LV).

Figure 6:
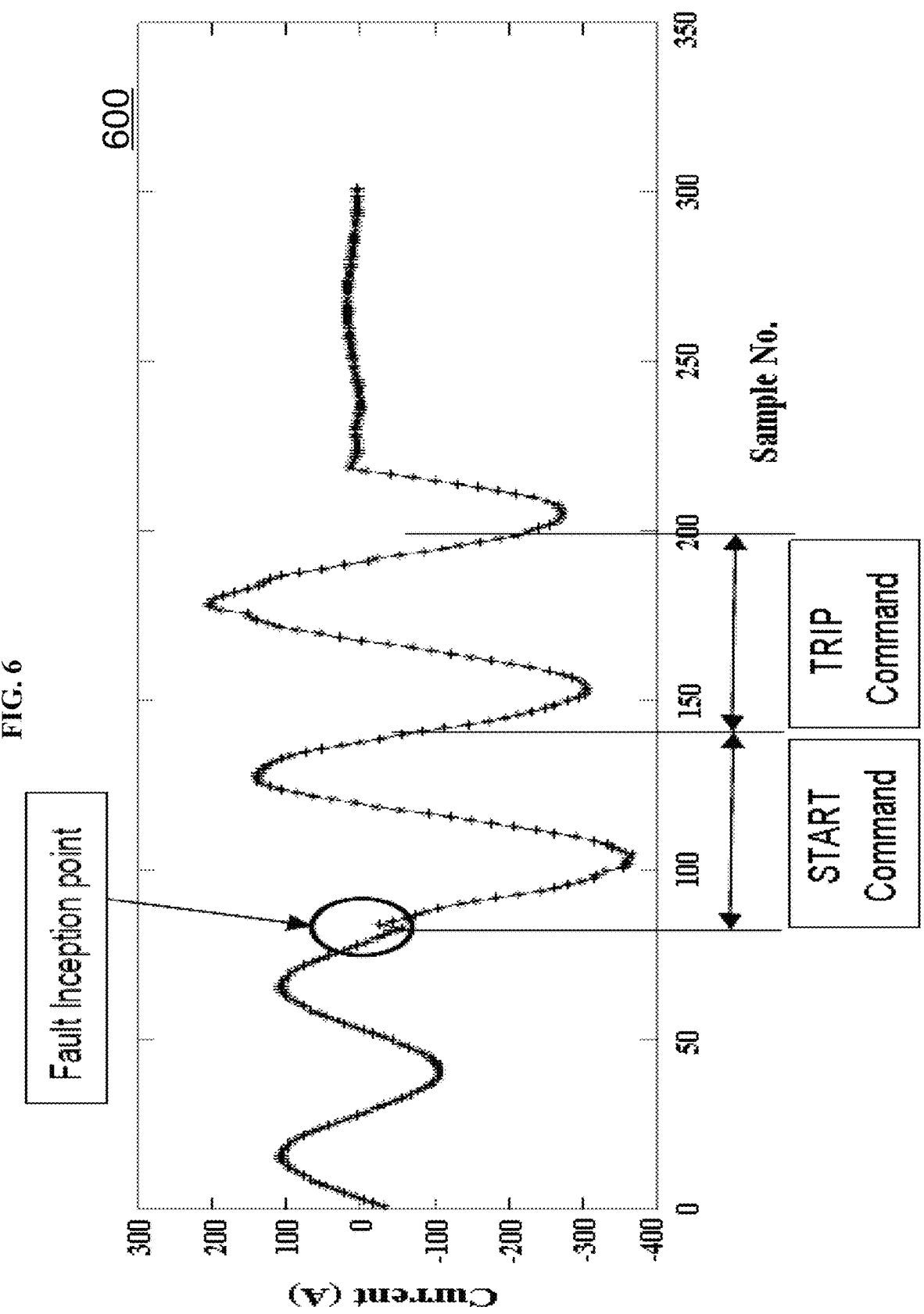
FIG. 6 is a plot of current (amperes or A) as a function of sample number according to various embodiments.

FIG. 6 is a plot 600 of current (amperes or A) as a function of sample number according to various embodiments. The sequence of overcurrent fault is illustrated in FIG. 6. The fault inception point is highlighted in FIG. 6. The current prior to the fault inception point is sinusoidal nominal current. After the fault, the current increases (that is why it is termed as overcurrent fault). Such an overcurrent may also happen due to load change. The duration of the overcurrent for a load change may be momentary; while the duration of the overcurrent due to a fault may be longer (the overcurrent may persist until the fault is cleared). The timing of the overcurrent may be utilized to effectively identify the fault, and also to differentiate from an overcurrent due to a load change.

The overcurrent may be monitored after the fault inception in a digital relay (the 'START' command means the start of the monitoring). The overcurrent may be monitored for about 1 cycle. Following the monitoring, if the overcurrent is being determined to be due to a fault, a 'TRIP' command may be issued by the relay in the next cycle to the circuit breaker. The circuit breaker may start to open on receipt of the 'TRIP' command (shown at around sample number 220 in FIG. 6).

Figure 7:
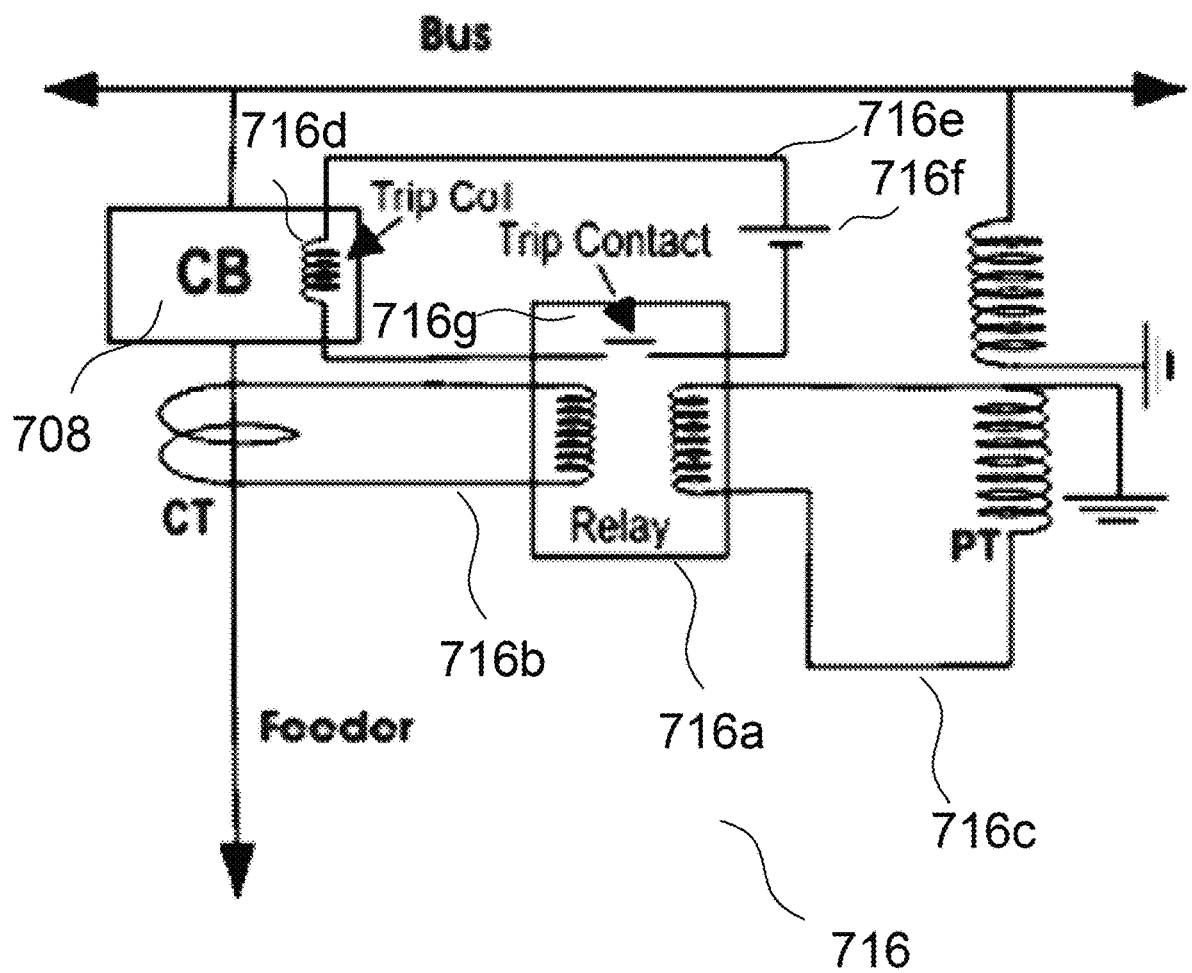
FIG. 7 is a schematic illustrating the interaction between a trigger mechanism and a circuit breaker according to various embodiments.

FIG. 7 is a schematic illustrating the interaction between a trigger mechanism 716 and a circuit breaker 708 according to various embodiments. The trigger mechanism 716 may include a relay 716a, a current transformer (CT) 716b, a potential transformer (PT) 716c, and a trip coil 716d. The relay 716a may get current and voltage measurements from the current transformer 716b and the potential transformer 716c respectively. The relay 716a may determine whether the current is above a predetermined level, e.g. above 100 A. The relay 716a may use a detection sequence similar to the detection sequence illustrated in FIG. 6. When the relay 716a determines that the current is above the predetermined level, the relay 716a may issue a command to the circuit breaker 708, e.g. through a trip coil 716d. The circuit breaker 708 may, upon receipt of the command, start to switch to the open mode. For modern relays, the connection between the relay and the circuit breaker may be distant, and may be established through a wired, a wireless connection, and/or through the internet (e.g. using IEC 61850 standard). In various embodiments, the relay 716a may be an electronic relay. In various embodiments, the trigger mechanism 716 may include trip circuit 716e including a trip coil 716d. The relay 716a may trigger the circuit breaker 708 through the trip coil 716d. Besides the trip coil 716d, the trip circuit 716e may include a power source 716f and a trip contact 716g connected in series with the trip coil 716d. When the relay 716a is activated, trip contact 716g may be activated to close the trip circuit 716e. A current flows through the trip circuit 716e due to the power source 716f. The trip coil 716d may be energized by the current, and may trigger the circuit breaker 708 to open.

FIG. 8 is a schematic illustrating the switching of a circuit breaker 808 according to various embodiments. The circuit breaker 808 may include nominal contacts 818. The circuit breaker 808 may also include arcing contacts 820. The nominal contacts 818 may be connected in parallel to the arcing contacts 820.

FIG. 8 shows the breaking operation of the circuit breaker 808 according to various embodiments. After the 'TRIP' command is received, the nominal contacts 818 may firstly open. After a while, the arcing contacts 820 may open. Generally, opening of contacts may refer to disconnecting the contacts so there is no current flow between the contacts, and opening of contacts may refer to connecting the contacts so there is a current flow between the contacts. In other words, closed contacts may refer to contacts which are in contact with each other (or nearly in contact so that an arc current flows between the contacts), and conduction of current between the closed contacts may be possible, while open contacts may refer to contacts which are electrically isolated from each other.

During the time interval between the two operations, the current flow may commute fully to the arcing contacts 820, which are still closed. A certain time period may be needed for the commutation of the current into the ablation contact system in which the current may be interrupted by use of self-blast principle. The ablation contact system may refer to the arcing contacts 820. The arcing contacts 820 may be ablated by the current arc passing through the arcing contact 820. When an arcing current flows through the arcing contacts 820, the current may cause pressure to increase, thus opening a valve. A gas such as $SF_6$ or a vacuum may be introduced from a chamber to a further chamber in which the arcing contacts 820 are in through the valve. The gas or vacuum may then quench the arcing current.

The ablation may cause the arcing contact 820 to get shorter, and may cause the time interval between the two opening operations to get shorter over time.

Figure 9A:
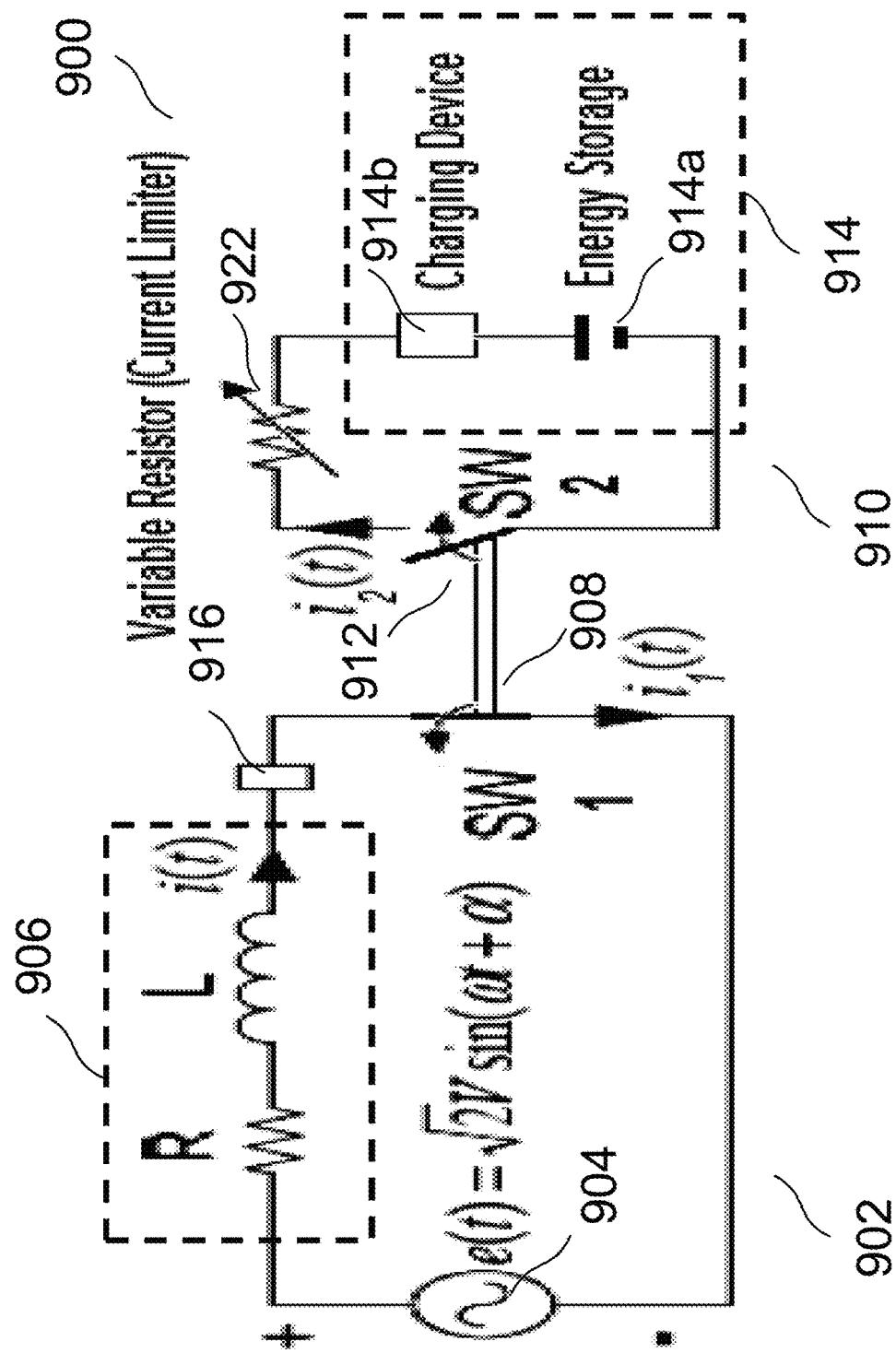
FIG. 9A is a schematic of a power system according to various embodiments. The power system may include a main circuit arrangement.

FIG. 9A is a schematic of a power system 900 according to various embodiments. The power system may include a main circuit arrangement 902. The main circuit arrangement 902 may include a power source 904, a load 906, and a circuit breaker (CB) 908. The load 906 may be represented by a resistor (R) connected in series with an inductor (L). The power system 900 may also include an energy harvesting circuit arrangement 910. The energy harvesting circuit arrangement 910 may include an operating switch 912 connected in series with an energy harvester 914. The energy harvester 914 may include an energy storage device 914a, and a charging device 914b connected in series with the energy storage device 914a. The energy harvesting circuit arrangement 910 may also include a variable resistor 922. The power system 900 may also include a trigger mechanism 916. The trigger mechanism 916 may be connected to the main circuit arrangement 902 or may be part of the main circuit arrangement 902. The trigger mechanism 916 may be connected in series with the power source 904, the load 906, and the circuit breaker (CB) 908.

As shown in FIG. 9A (and also FIG. 3), the energy harvester 914, 314 may be put in parallel to the CB 908, 308. There may be no requirement to change the design of the CB 808 as shown in FIG. 8. The trigger mechanism 916, 316 may issue the 'TRIP' command simultaneously to the CB 908, 308 as well as the energy harvester 914, 314. As shown in FIG. 9, the total current i(t) may thus be branched into two paths, the first part $i_1(t)$ flowing through the CB breaking path, and the second part $i_2(t)$ to the energy harvester path (i.e. to the energy harvester 908, 308, alternatively referred to as the energy storage path). The CB 908, 308 may open as illustrated in FIG. 8.

Figure 9B:
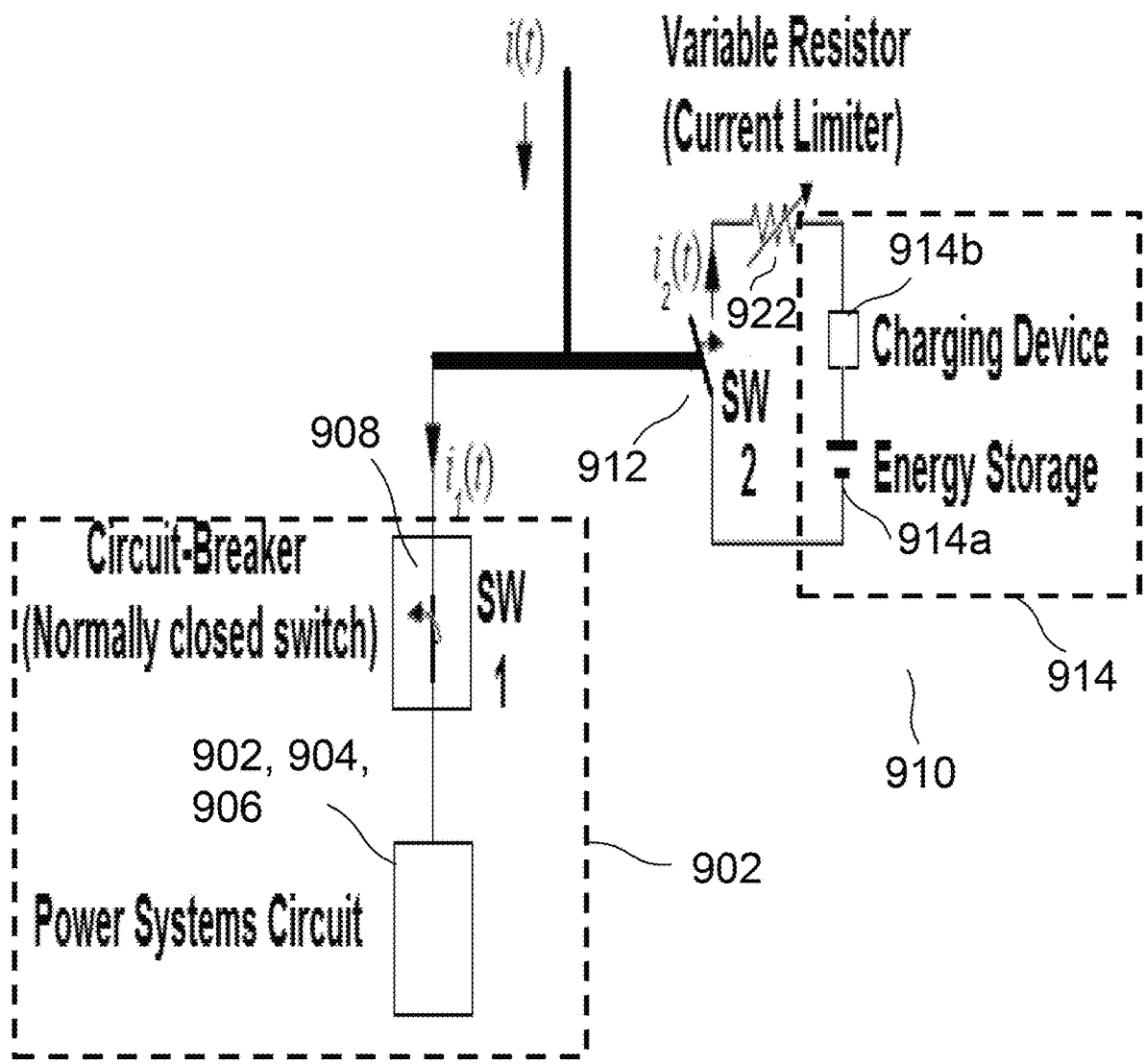
FIG. 9B is a schematic showing a portion of the power system illustrated in FIG. 9A according to various embodiments.

FIG. 9B is a schematic showing a portion of the power system illustrated in FIG. 9A according to various embodiments. FIG. 9B may be viewed as an equivalent system diagram, showing the physical current branching path (T-type connection) for the circuit breaker 908 and the energy harvester 918.

The energy harvester path or energy storage path (i.e. the current path leading to the energy harvester 914) may only operate while the CB 908 starts to open. Under normal operating conditions SW1 908 may be closed, while SW2 912 may be open. Under fault or transient operations, when SW1 908 may start opening, while SW2 912 may get closed. Once the CB is fully opened, i.e., when SW1 908 is open, the energy harvester 914 may be cut off, i.e., SW2 912 may be opened again. The energy storage 914a may be of hybrid type, e.g., battery and supercapacitor, to account for different transient dynamics.

There may be ways to prevent a situation in which all the fault current is being commutated to the energy storage path, and damaging it.

Firstly the opening of SW2 912 may be adjusted, i.e., timing the opening of SW2 912 to ensure the energy balance. In other words, SW2 912 may close for a predetermined duration and start to open again after the predetermined duration. The shorter the predetermined duration, the less current directed to the energy storage path.

Additionally or alternatively, using the variable resistor 922 in series with the energy storage 914a may limit the damage to the energy storage 914a. The variable resistor 922 may be a fault current limiter type device. The variable resistor 922 may be adjusted to limit the amount of current flow through the energy harvester circuit 910. The amount of maximum charging capacity of the energy storage device 914a may determine the maximum amount of current allowed to flow through the energy harvester circuit 910, which may be controlled or set by adjusting the variable resistor 922.

Figure 10:
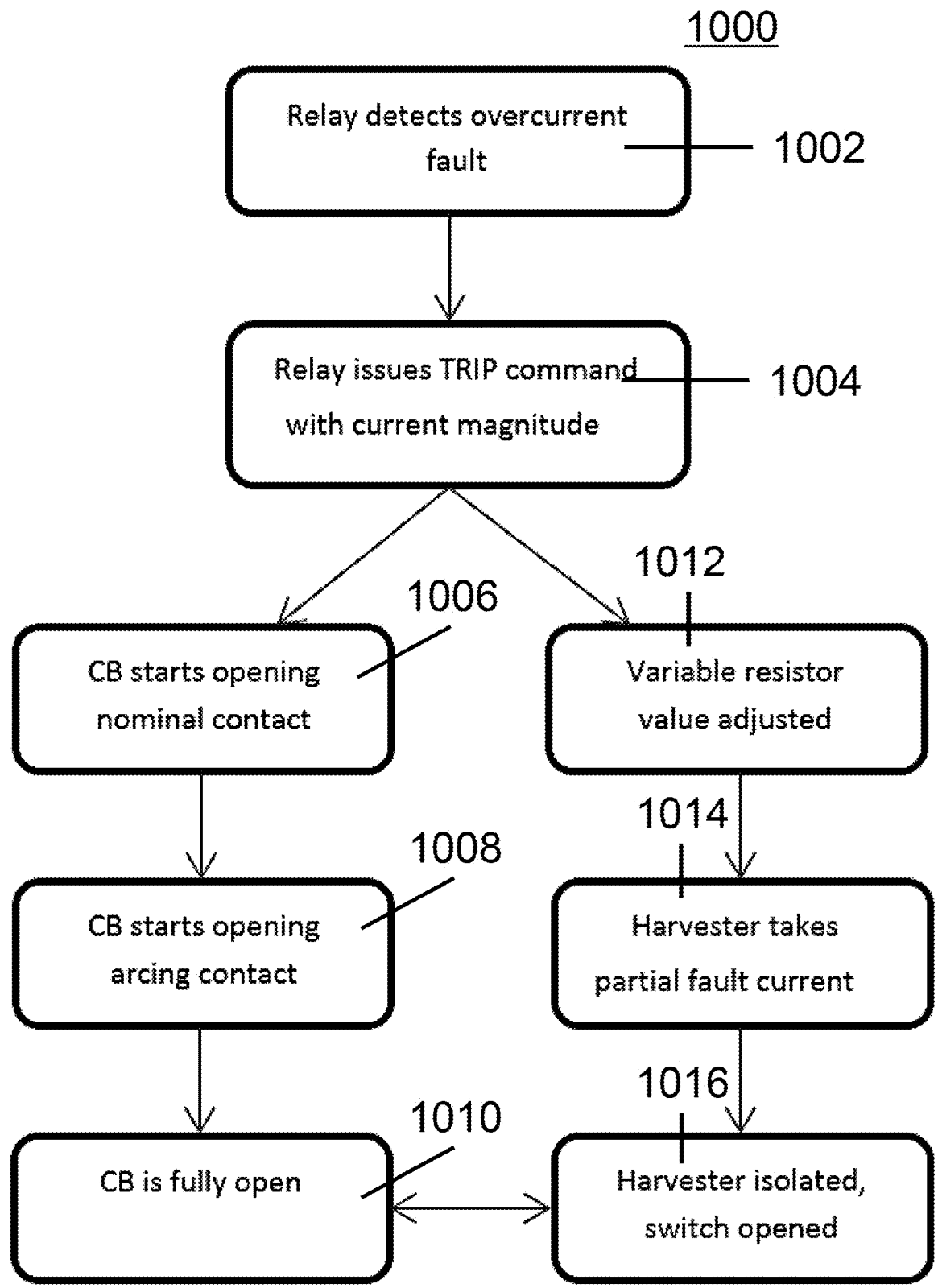
FIG. 10 is a schematic of the operation of a power system according to various embodiments.

FIG. 10 is a schematic 1000 of the operation of a power system according to various embodiments. In 1002, the relay may detect an overcurrent fault. In 1004, the relay may issue a "TRIP" command with current magnitude. Along SW1 path (i.e. the CB breaking path), the circuit breaker (CB) may start opening the nominal contacts in 1006. Along the SW2 path (i.e. the energy storage path or energy harvester path), the value of the variable resistor may be adjusted. In 1008, the CB may start opening the arcing contacts so that the CB is in open mode (i.e. fully opened) in 1010. In 1014, the energy harvester may take or receive partial fault current. In 1016, the energy harvester may be electrically isolated as SW2 is opened. SW2 may be opened when CB is in open mode (i.e. in step 1010).

In various embodiments, an auxiliary device or energy harvesting circuit arrangement may be provided. The auxiliary device or energy harvesting circuit may be connected to the main circuit arrangement. The auxiliary device or the energy harvesting circuit arrangement may include an operating switch and an energy harvester.

A trigger mechanism may also be provided. The trigger mechanism may be a separate device from the main circuit arrangement and the energy harvesting circuit arrangement. In various alternate embodiments, the trigger mechanism may be part of the main circuit arrangement or the energy harvesting circuit arrangement. The trigger mechanism may be configured to, when detecting a current above a predetermined value in the main circuit arrangement, trigger the circuit breaker to switch from a closed mode in which the circuit breaker electrically connects the load to the power source, to an open mode in which the load is electrically isolated from the power source, and trigger the operating switch to switch from an open mode in which the energy harvester is electrically isolated from the power source to a closed mode in which the operating switch electrically connects the energy harvester to the power source for a predetermined duration, and back to the open mode after the predetermined duration, thereby storing electrical energy in the energy harvester.

Sustainable energy is in focus. Various embodiments may aim to recover a significant part of the wasted energy due to switching (fault or nominal) in the power system.

Circuit breakers may be required to be part of the protective devices in power systems. The topology may be fixed for existing state-of-the-art power transmission systems. Various embodiments may relate to a separate auxiliary device with SW2 and the energy storage part.

The auxiliary device or energy harvesting circuit arrangement may be made separately from the main circuit arrangement, and subsequently assembled with the main circuit arrangement without modifying the CB architecture.

The energy harvesting circuit arrangement may seamlessly integrate with existing AC power transmission and distribution topology.

Wide scale deployment of such an auxillary device may enable big amount of lost energy harnessing.

Another advantage may be prolonged lifetime of the CB. Thus, CB manufacturers may be keen to use or promote the auxiliary device.

The size of such device may depend on the voltage level.

For HV (>65 kV) and MV (<35 kV) applications, various embodiments may be used mainly to harvest fault energy.

Various embodiments may act as a smart switch at LV (<1 kV), e.g., in household applications. Everyday there are millions of switching operations, like on/off switches. All switching operation involving small scale energies when harvested may provide significant reutilization of energy. Various embodiments may be used in conjunction with miniature circuit breakers (MCBs) etc.

Simulation is carried out on the power system illustrated in FIG. 9A. A three phase fault is created and the fault is cleared after 4 cycles by opening the circuit breaker (CB) or SW1 908. At the same instant, SW2 912 is closed to allow the energy harvesting circuit 910 to connect across the SW1 908.

Figure 11:
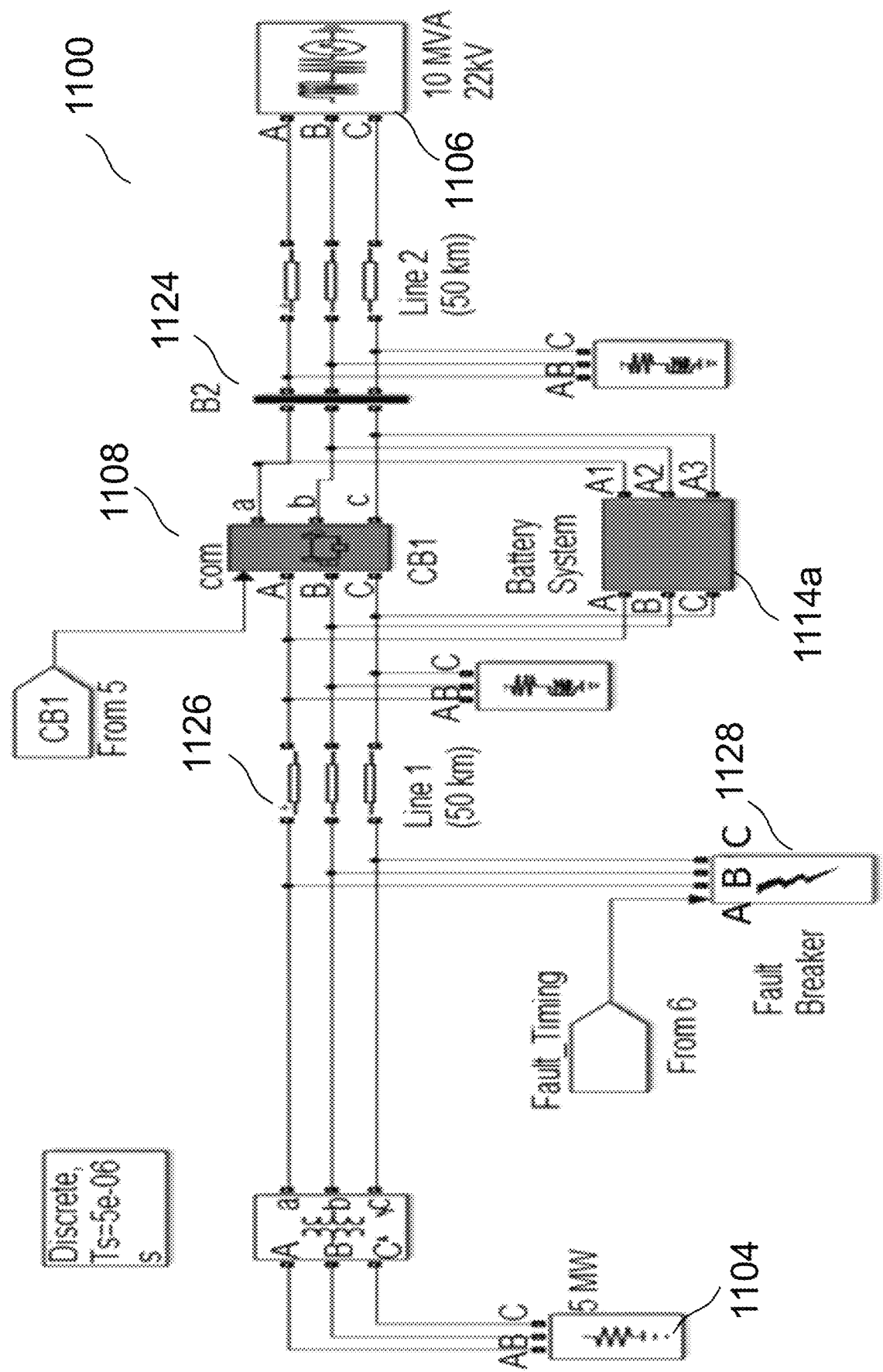
FIG. 11 shows a schematic of the model in MATLAB/Simulink according to various embodiments.

A 22 kV power system network is considered for this study. FIG. 11 shows a schematic of the model 1100 in MATLAB/Simulink according to various embodiments. In this study, the circuit breaker 1108 is connected to the B2 bus 1124 and the energy storage system 1114a is connected across the circuit breaker 1108. A three phase fault 1128 is created at the end of transmission line-1 1126 at 1.1 sec as shown in FIG. 11. At 1.18 sec the circuit breaker 1108 starts opening to clear the fault, and simultaneously the battery system 1114a is connected to power source 1104 (following the schematic diagram shown in FIG. 9A). After 5 cycles of fault inception, the fault is cleared at 1.2 sec, but the transient dynamics still exist in the system. The main circuit breaker 1108 is closed at 1.3 sec. Load is represented by 1106.

Figure 12A:
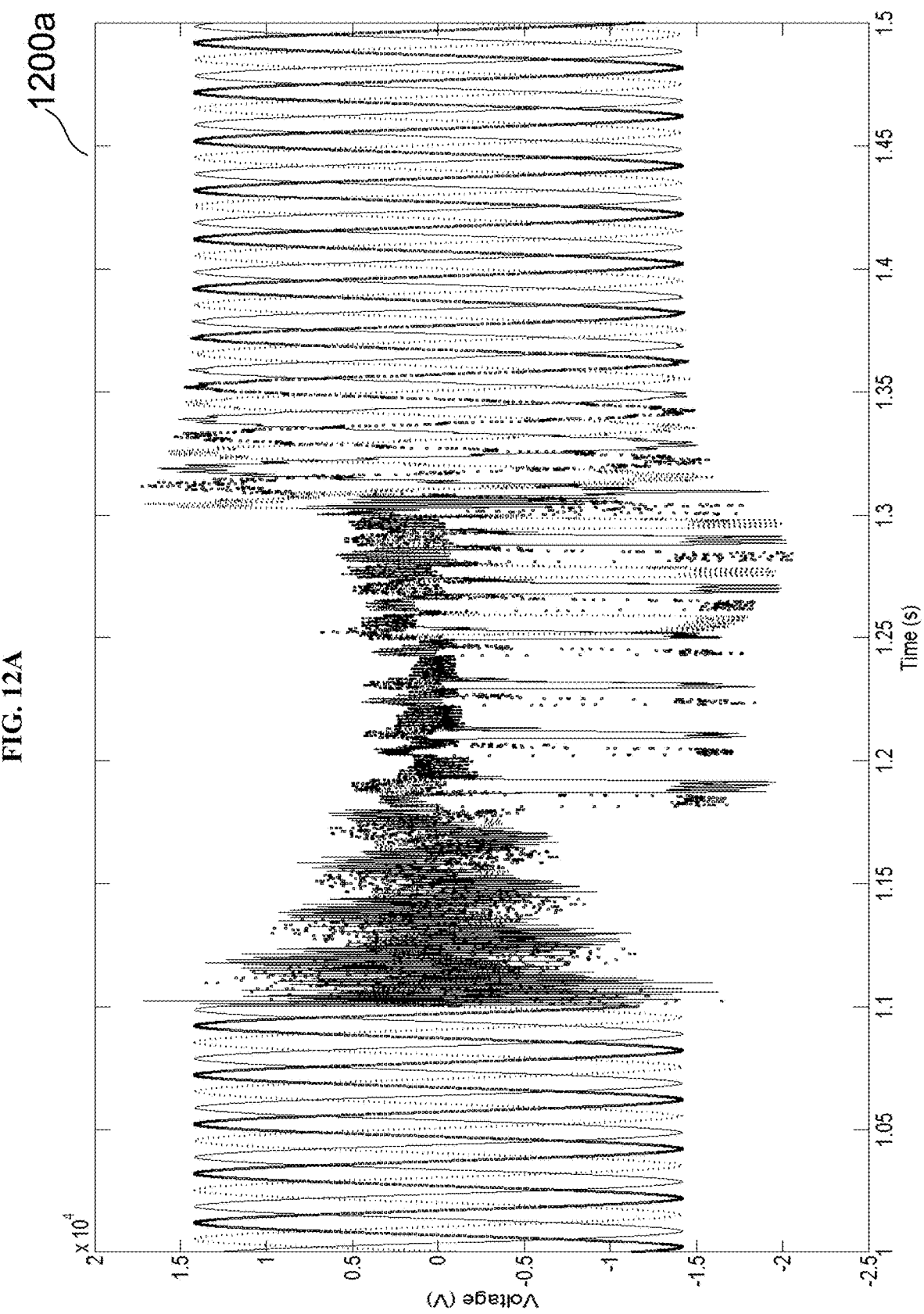
FIG. 12A is a plot of voltage (volts or V) as a function of time (seconds or sec) showing the simulated variation of alternating current (AC) voltage.
Figure 12B:
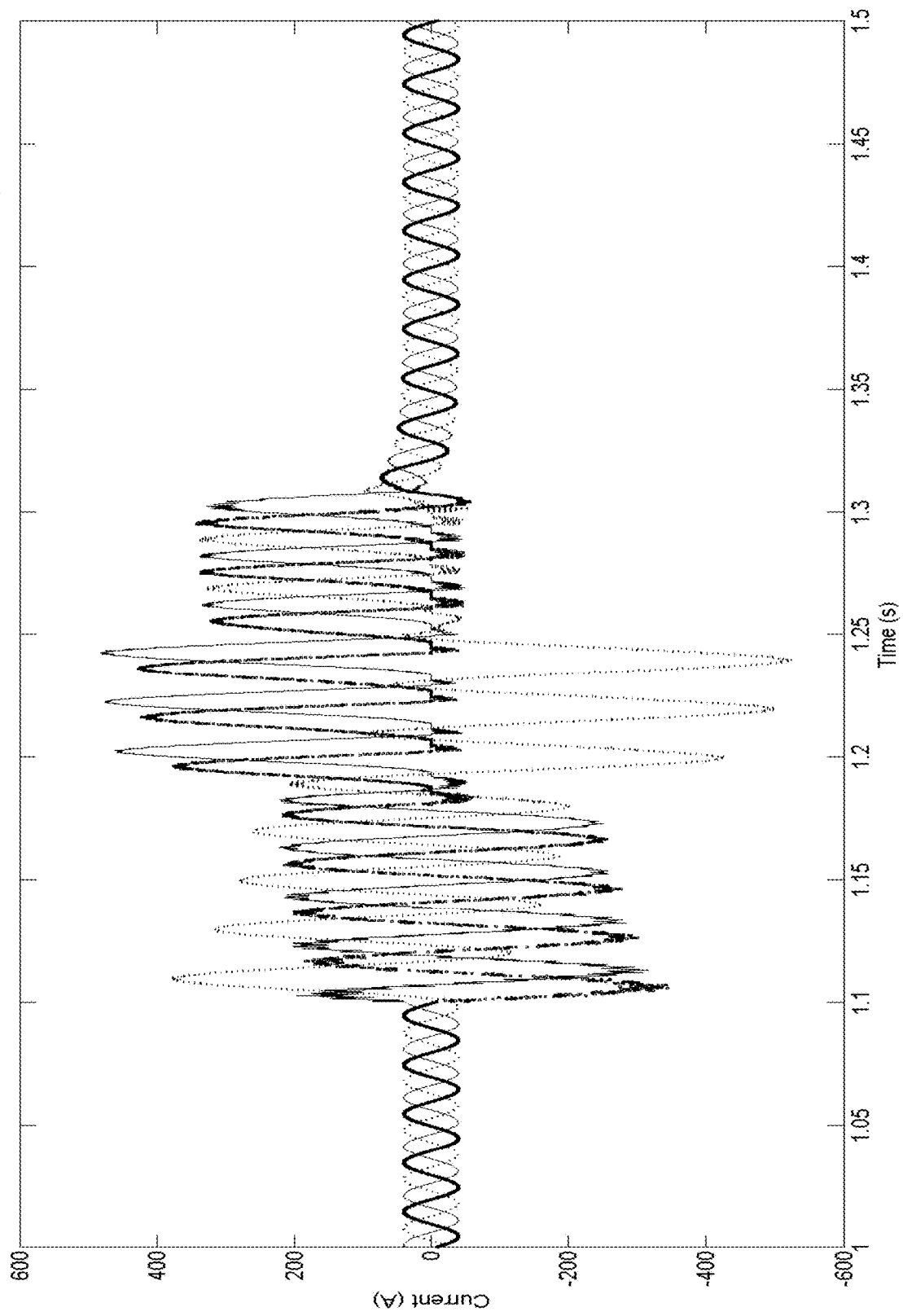
FIG. 12B is a plot of current (amperes or A) as a function of time (seconds or sec) showing the simulated variation of alternating current (AC).
Figure 12C:
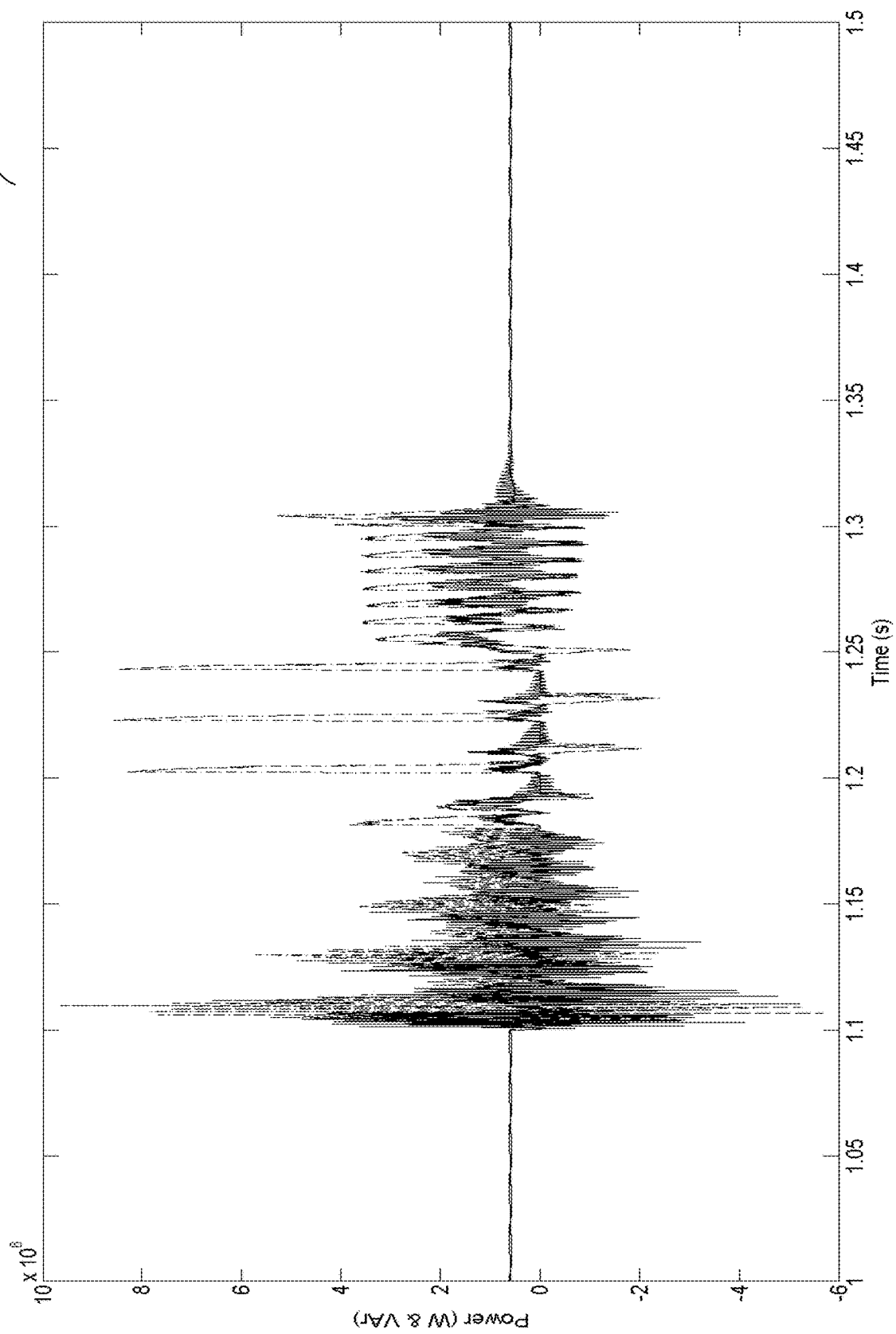
FIG. 12C is a plot of power (watts or W) as a function of time (seconds or sec) showing the simulated variation of real power and reactive power.
Figure 12D:
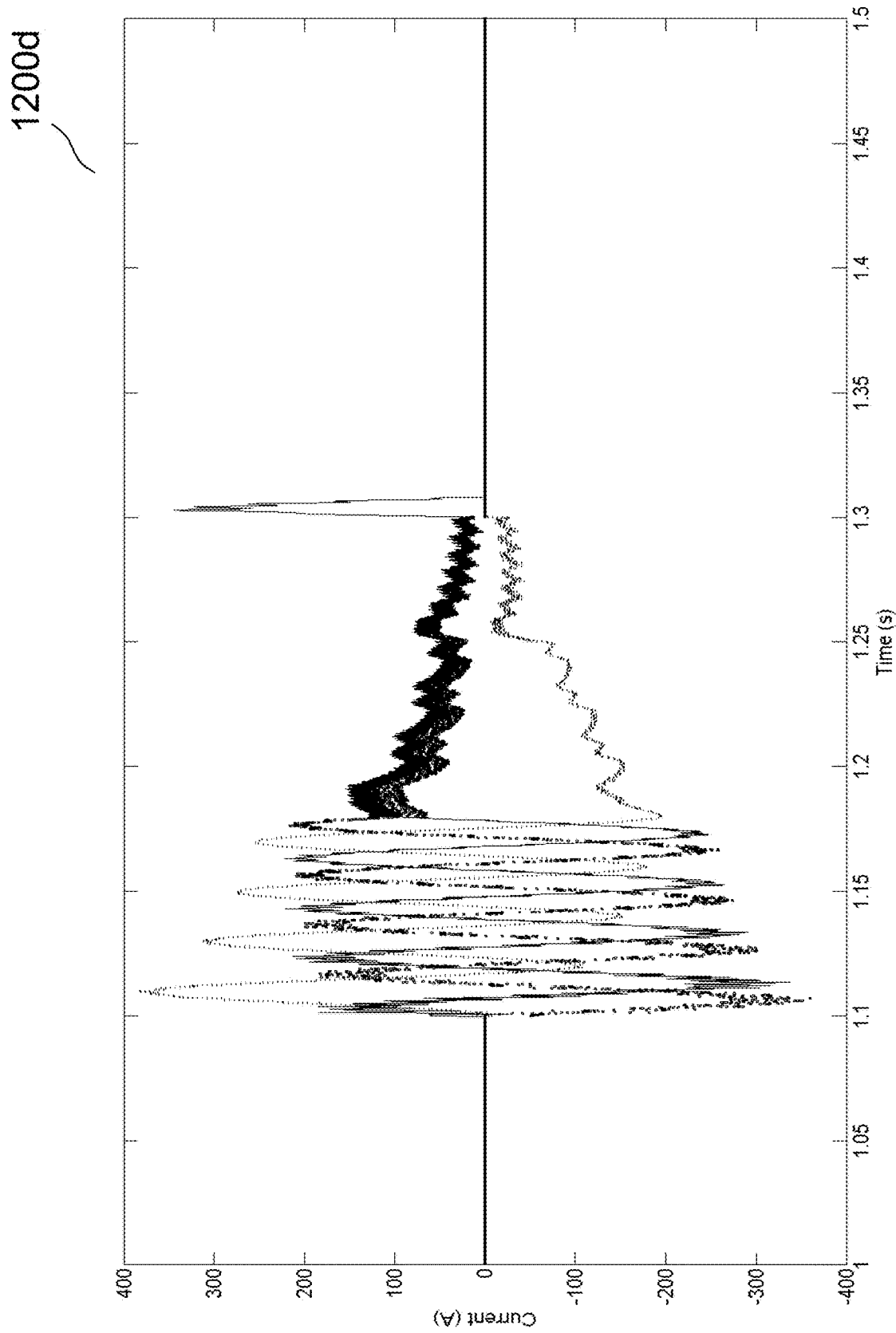
FIG. 12D is a plot of fault current (amperes or A) as a function of time (seconds or sec) showing the simulated variation of fault current.
Figure 12E:
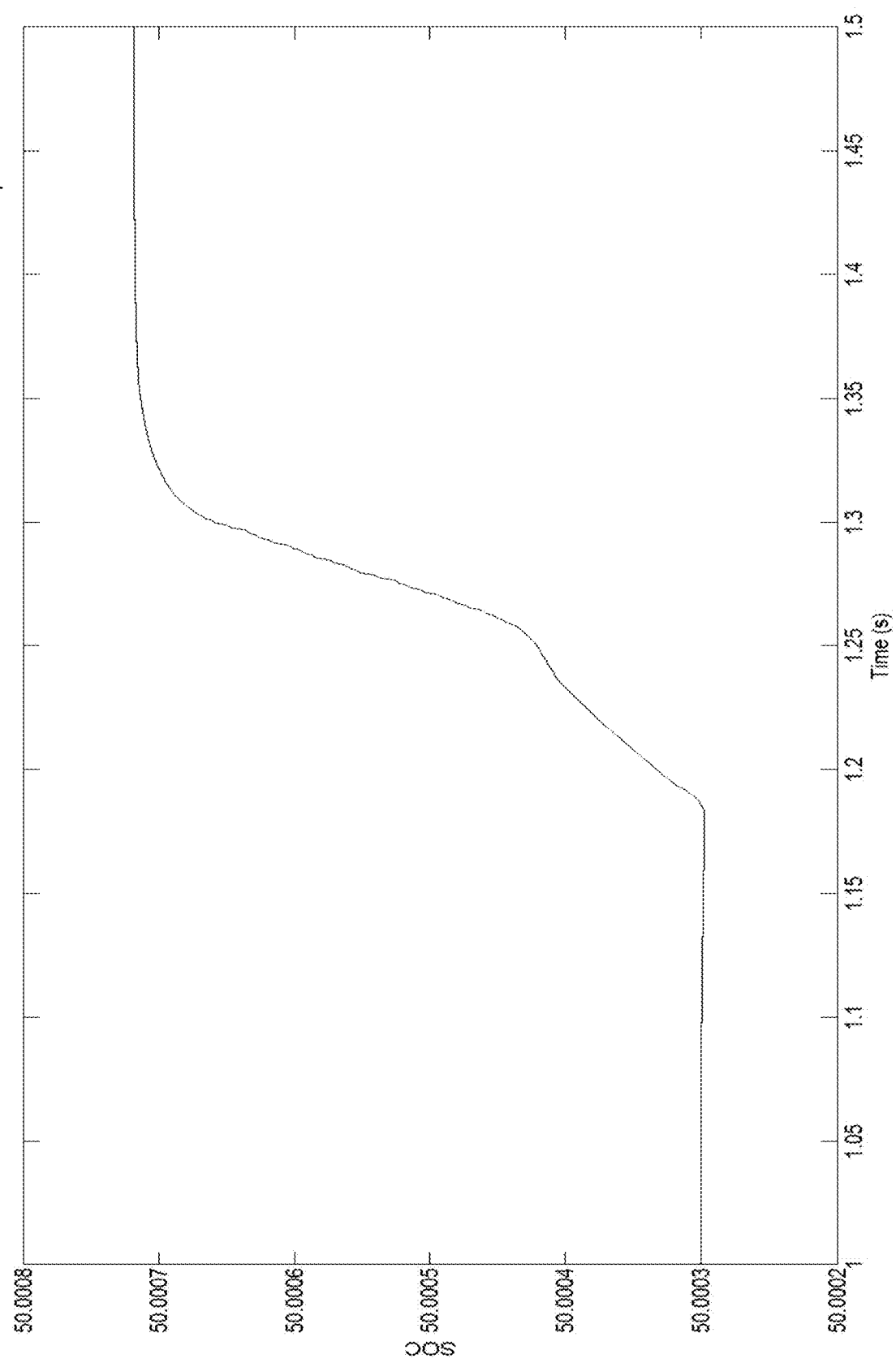
FIG. 12E is a plot of percentage state of charge (% SOC, percentage or %) as a function of time (seconds or sec) showing the simulated variation of percentage state of charge.

FIG. 12A is a plot 1200a of voltage (volts or V) as a function of time (seconds or sec) showing the simulated variation of alternating current (AC) voltage. FIG. 12B is a plot 1200b of current (amperes or A) as a function of time (seconds or sec) showing the simulated variation of alternating current (AC). FIG. 12C is a plot 1200c of power (watts or W) as a function of time (seconds or sec) showing the simulated variation of real power and reactive power. FIG. 12D is a plot 1200d of fault current (amperes or A) as a function of time (seconds or sec) showing the simulated variation of fault current. FIG. 12E is a plot 1200e of percentage state of charge (% SOC, percentage or %) as a function of time (seconds or sec) showing the simulated variation of percentage state of charge.

From the results of FIGS. 12A-E, it may be observed that the short circuit current is increased during the fault, and the fault current is reduced to zero by opening the circuit breaker. Further, the state of charge (SOC) of battery is increasing, i.e., the energy stored in the battery is increasing, during the opening of the main circuit breaker as shown in FIG. 12E, which provides evidence for the proposed power system. The different patterned lines in FIGS. 12A-D represent different phases.

Figure 13A:
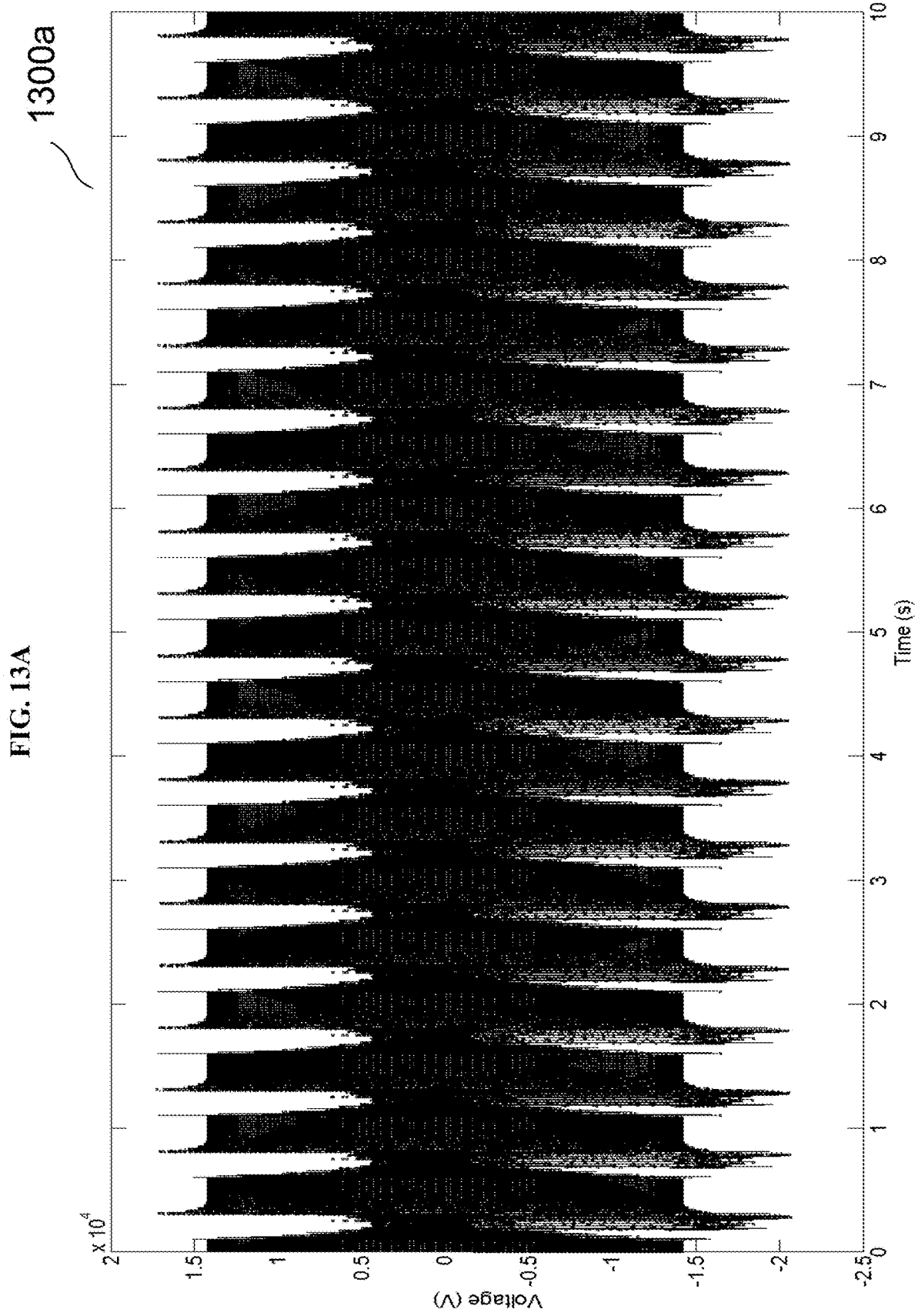
FIG. 13A is a plot of voltage (volts or V) as a function of time (seconds or sec) showing the simulated variation of alternating current (AC) voltage as a result of frequent opening of the circuit breaker.
Figure 13B:
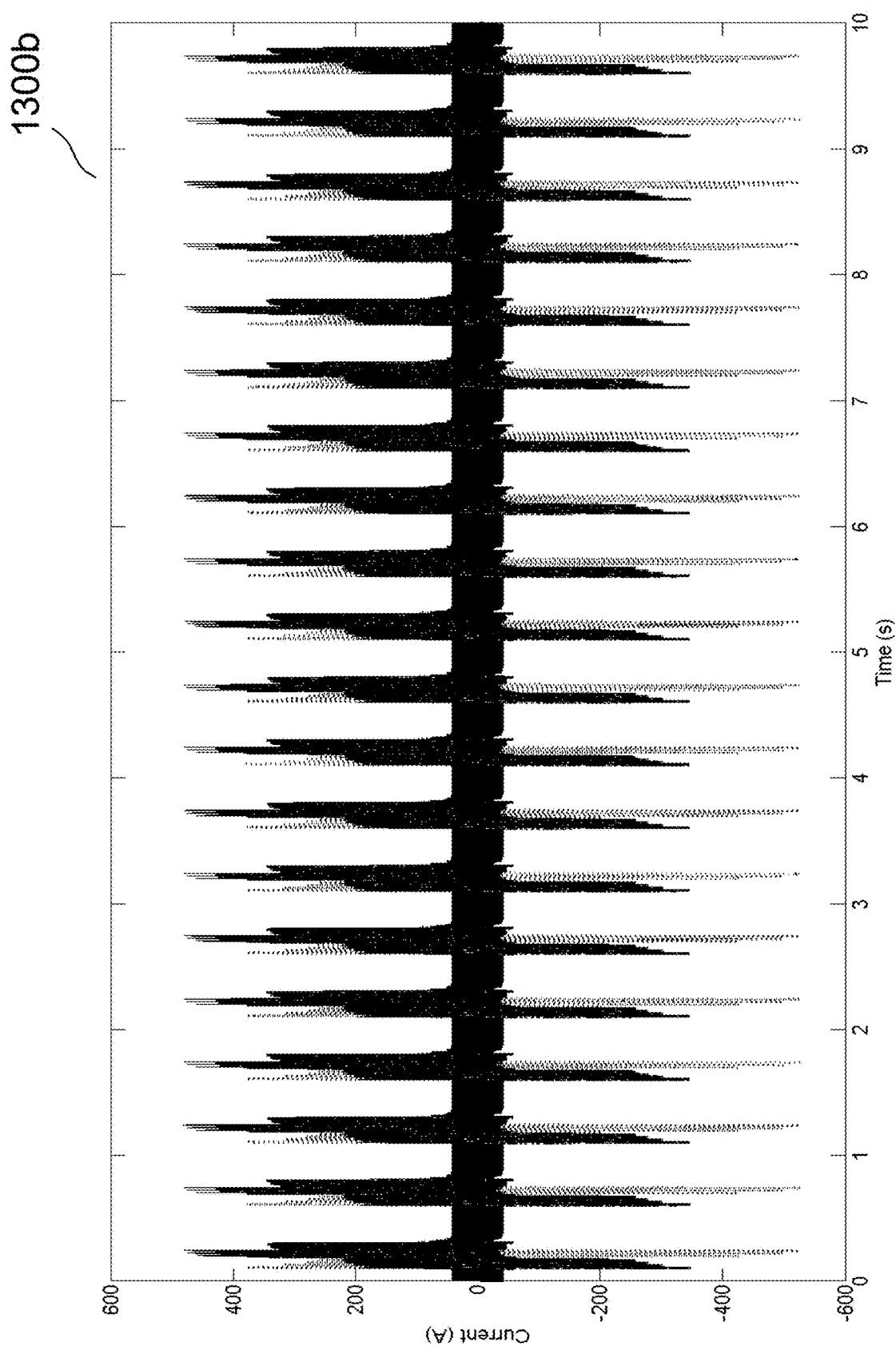
FIG. 13B is a plot of current (amperes or A) as a function of time (seconds or sec) showing the simulated variation of alternating current (AC) as a result of frequent opening of the circuit breaker.
Figure 13C:
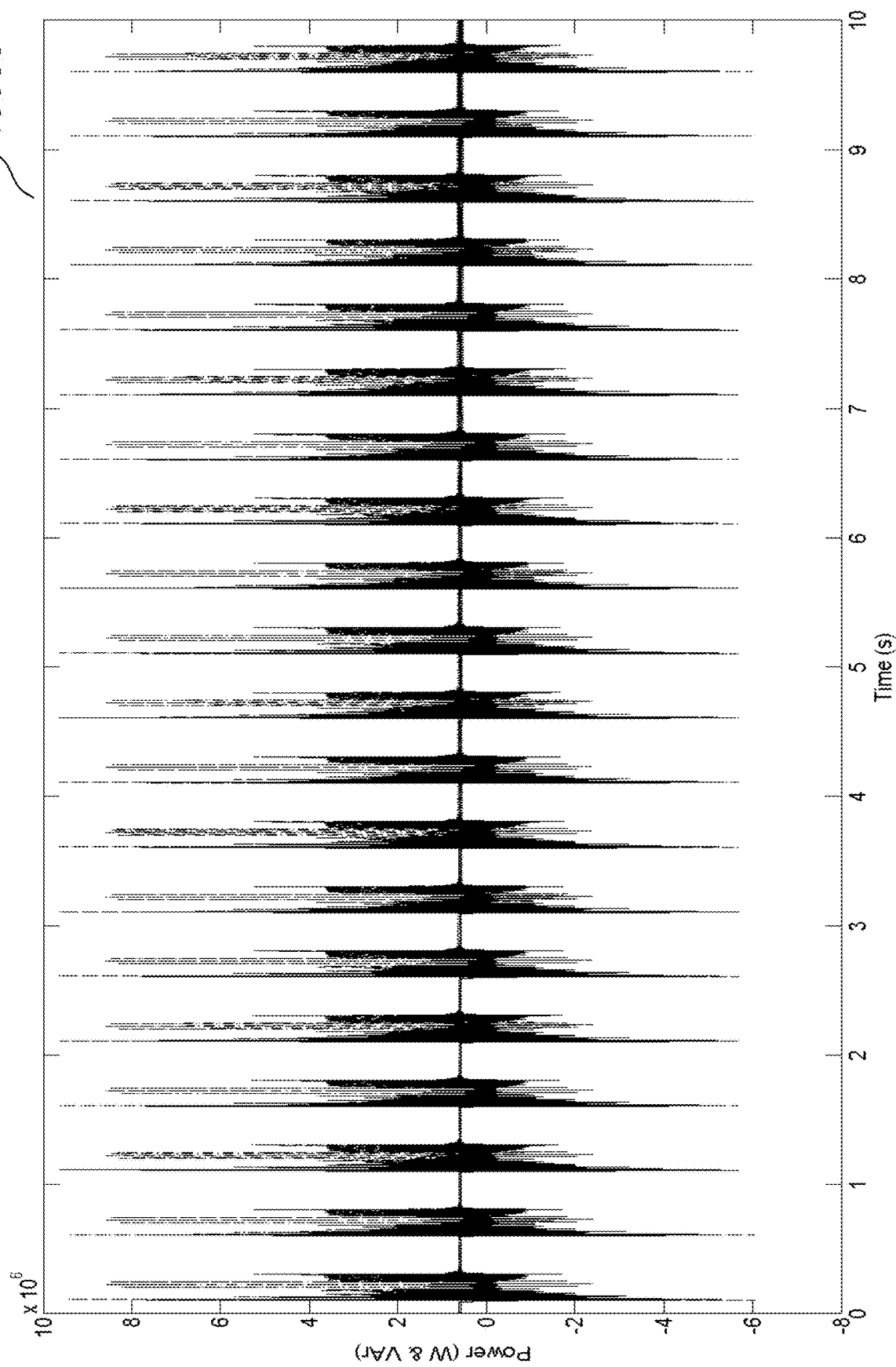
FIG. 13C is a plot of power (watts or W) as a function of time (seconds or sec) showing the simulated variation of real power and reactive power as a result of frequent opening of the circuit breaker.
Figure 13D:
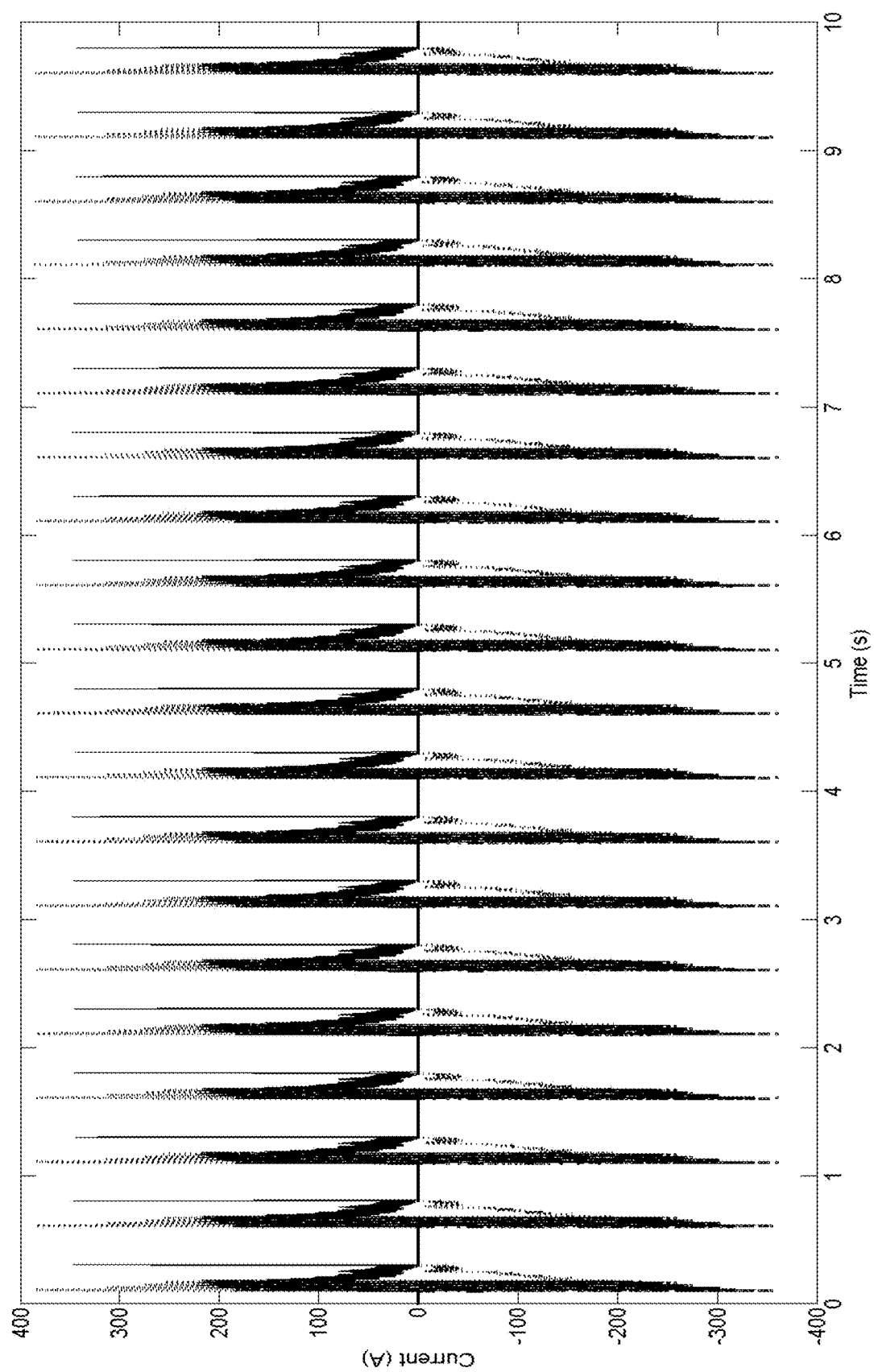
FIG. 13D is a plot of fault current (amperes or A) as a function of time (seconds or sec) showing the simulated variation of fault current as a result of frequent opening of the circuit breaker.
Figure 13E:
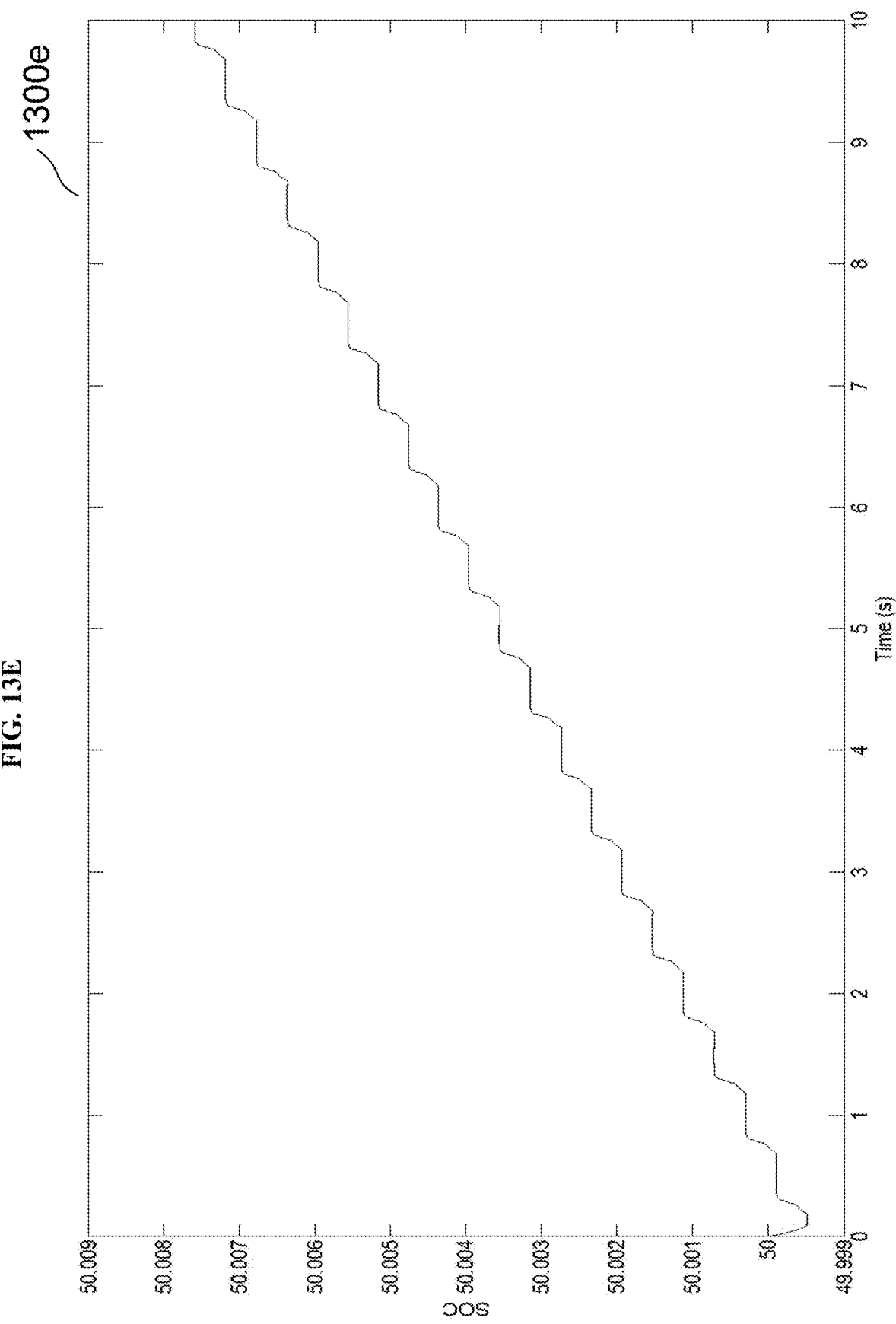
FIG. 13E is a plot of percentage state of charge (% SOC, percentage or %) as a function of time (seconds or sec) showing the simulated variation of percentage state of charge as a result of frequent opening of the circuit breaker.

To further demonstrate the efficacy of the fault current harvesting technology, a case of frequent opening of the circuit breaker is studied. FIG. 13A is a plot 1300a of voltage (volts or V) as a function of time (seconds or sec) showing the simulated variation of alternating current (AC) voltage as a result of frequent opening of the circuit breaker. FIG. 13B is a plot 1300b of current (amperes or A) as a function of time (seconds or sec) showing the simulated variation of alternating current (AC) as a result of frequent opening of the circuit breaker. FIG. 13C is a plot 1300c of power (watts or W) as a function of time (seconds or sec) showing the simulated variation of real power and reactive power as a result of frequent opening of the circuit breaker. FIG. 13D is a plot 1300d of fault current (amperes or A) as a function of time (seconds or sec) showing the simulated variation of fault current as a result of frequent opening of the circuit breaker. FIG. 13E is a plot 1300e of percentage state of charge (% SOC, percentage or %) as a function of time (seconds or sec) showing the simulated variation of percentage state of charge as a result of frequent opening of the circuit breaker. The different patterned lines in FIGS. 13A-D represent different phases.

FIG. 13E shows that the battery SOC is increasing continuously. It is to be noted that the simulation results may be scalable, in terms of voltage and current ratings.

Such a device may facilitate other applications like low voltage ride through (LVRT), better grid control, faster power swing/oscillation withstand capability, etc.

FIGS. 13A-E are longer time scales of FIGS. 12A-E to show context.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A power system comprising:
   a main circuit arrangement comprising:
      a power source;
      a load; and
      a circuit breaker;
   an energy harvesting circuit arrangement connected to the main circuit arrangement, the energy harvesting circuit arrangement comprising:
      an operating switch; and
      an energy harvester; and
   a trigger mechanism configured to, when detecting a current above a predetermined value in the main circuit arrangement, trigger the circuit breaker to switch from a closed mode in which the circuit breaker electrically connects the load to the power source, to an open mode in which the load is electrically isolated from the power source, and trigger the operating switch to switch from an open mode in which the energy harvester is electrically isolated from the power source to a closed mode in which the operating switch electrically connects the energy harvester to the power source for a predetermined duration, and back to the open mode after the predetermined duration, thereby storing electrical energy in the energy harvester, wherein the circuit breaker comprises a nominal contact switch and an arcing contact switch connected in parallel to the nominal contact switch; and wherein the circuit breaker is configured to, during switching from the closed mode to the open mode, switch the nominal contact switch from a closed position to an open position before switching the arcing contact switch from a closed position to an open position.

2. The power system according to claim 1,
wherein the trigger mechanism comprises a protective relay.

3. The power system according to claim 2,
wherein the protective relay is an electronic relay.

4. The power system according to claim 2,
wherein the protective relay further comprises a trip coil.

5. The power system according to claim 1,
wherein the energy harvester comprises:
an energy storage device; and
a charging device configured to charge the energy storage device when the operating switch is in the closed position.

6. The power system according to claim 5,
wherein the energy storage device may be selected from a group consisting of a battery, a supercapacitor and a combination thereof.

7. The power system according to claim 1,
wherein the energy harvesting circuit arrangement further comprises a variable resistor for limiting a charging current flowing through the energy harvesting circuit arrangement during the predetermined duration.

8. The power system according to claim 1,
wherein when the nominal contact switch is in the open position and when the arcing contact switch is in the closed position, a current flows through the arcing contact switch in the closed position.

9. The power system according to claim 1,
wherein the predetermined value is selected from a range of about 1.01 times to about 20 times relative to a normal operating current flowing through the main circuit arrangement.

10. The power system according to claim 1,
wherein the trigger mechanism is configured to trigger the circuit breaker to switch from the closed mode to the open mode, and trigger the operating switch to switch from the open mode to the closed mode for the predetermined duration, and back to the open mode after the predetermined duration, when the trigger mechanism detects the current above the predetermined level for a predetermined time period.

11. The power system according to claim 1,
wherein the circuit breaker comprises a vacuum for electrically isolating the load from the power source when the circuit breaker is in the open mode.

12. The power system according to claim 1,
wherein the circuit breaker comprises a quenching gas for electrically isolating the load from the power source when the circuit breaker is in the open mode.

13. A method of forming a power system, the method comprising:
providing a main circuit arrangement comprising:
a power source;
a load; and
a circuit breaker;
connecting an energy harvesting circuit arrangement to the main circuit arrangement, the energy harvesting circuit arrangement comprising:
an operating switch; and
an energy harvester; and
providing a trigger mechanism, the trigger mechanism configured to, when detecting a current above a predetermined value in the main circuit arrangement, trigger the circuit breaker to switch from a closed mode in which the circuit breaker electrically connects the load to the power source, to an open mode in which the load is electrically isolated from the power source, and trigger the operating switch to switch from an open mode in which the energy harvester is electrically isolated from the power source to a closed mode in which the operating switch electrically connects the energy harvester to the power source for a predetermined duration, and back to the open mode after the predetermined duration, thereby storing electrical energy in the energy harvester,
wherein the circuit breaker comprises a nominal contact switch and an arcing contact switch connected in parallel to the nominal contact switch; and
wherein the circuit breaker is configured to, during switching from the closed mode to the open mode, switch the nominal contact switch from a closed position to an open position before switching the arcing contact switch from a closed position to an open position.

14. The method according to claim 13,
wherein the trigger mechanism comprises a protective relay.

15. The method according to claim 13,
wherein the energy harvester comprises:
an energy storage device; and
a charging device configured to charge the energy storage device when the operating switch is in the closed position.

16. The method according to claim 13,
wherein the energy harvesting circuit arrangement further comprises a variable resistor for limiting a charging current flowing through the energy harvesting circuit arrangement during the predetermined duration.

* * * * *